(12) United States Patent
Canich et al.

(10) Patent No.: US 7,812,104 B2
(45) Date of Patent: Oct. 12, 2010

(54) PRODUCTION OF PROPYLENE-BASED POLYMERS

(75) Inventors: Jo Ann M. Canich, Houston, TX (US); Peijun Jiang, League City, TX (US); Gary L. Casty, Easton, PA (US); Gabor Kiss, Hampton, NJ (US); Alexander Z. Voskoboynikov, Moscow (RU)

(73) Assignee: ExxonMobil Chemical Patents Inc., Houston, TX (US)

( * ) Notice: Subject to any disclaimer, the term of this patent is extended or adjusted under 35 U.S.C. 154(b) by 173 days.

(21) Appl. No.: 12/016,346

(22) Filed: Jan. 18, 2008

(65) Prior Publication Data

US 2009/0186995 A1 Jul. 23, 2009

(51) Int. Cl.
C08F 4/64 (2006.01)
C08F 4/642 (2006.01)
C08F 4/6592 (2006.01)
C08F 10/06 (2006.01)
B01J 31/22 (2006.01)
B01J 31/18 (2006.01)

(52) U.S. Cl. .......... 526/161; 526/160; 526/165; 526/172; 526/351; 526/943; 502/103; 502/152; 502/155

(58) Field of Classification Search ............ 526/160, 526/161, 165, 172, 351, 943; 502/103, 152, 502/155
See application file for complete search history.

(56) References Cited

U.S. PATENT DOCUMENTS

| | | | |
|---|---|---|---|
| 3,678,088 A | 7/1972 | Hedberg et al. |
| 4,769,510 A | 9/1988 | Kaminsky et al. |
| 4,794,096 A | 12/1988 | Ewen |
| 5,328,969 A | 7/1994 | Winter et al. |
| 5,434,116 A | 7/1995 | Sone et al. |
| 5,466,766 A | 11/1995 | Patsidis et al. |
| 5,489,659 A | 2/1996 | Sugano et al. |
| 5,504,232 A | 4/1996 | Winter et al. |
| 5,585,509 A | 12/1996 | Langhauser et al. |
| 5,672,668 A | 9/1997 | Winter et al. |
| 5,693,836 A | 12/1997 | Winter et al. |
| 5,756,608 A | 5/1998 | Langhauser et al. |
| 5,763,542 A | 6/1998 | Winter et al. |
| 5,840,644 A | 11/1998 | Küber et al. |
| 5,936,053 A | 8/1999 | Fukuoka et al. |
| 6,028,152 A | 2/2000 | Winter et al. |
| 6,087,292 A | 7/2000 | Winter et al. |
| 6,153,776 A | 11/2000 | Patton et al. |
| 6,169,051 B1 | 1/2001 | Mitani et al. |
| 6,291,699 B1 | 9/2001 | Birmingham et al. |
| 6,326,493 B1 | 12/2001 | Mitani et al. |
| 6,359,095 B1 | 3/2002 | Winter et al. |
| 6,399,723 B1 | 6/2002 | Burkhardt et al. |
| 6,451,938 B1 | 9/2002 | Fisher et al. |
| 6,458,982 B1 | 10/2002 | Schottek et al. |
| 6,465,700 B1 | 10/2002 | Sullivan et al. |
| 6,479,646 B1 | 11/2002 | Nakano et al. |
| 6,492,539 B1 | 12/2002 | Bingel et al. |
| 6,737,487 B2 | 5/2004 | Meverden |
| RE39,156 E | 7/2006 | Winter et al. |
| 7,276,567 B2 | 10/2007 | Voskoboynikov et al. |
| 2001/0031834 A1 | 10/2001 | Ushioda et al. |
| 2001/0053833 A1 | 12/2001 | Nakano et al. |
| 2002/0002261 A1 | 1/2002 | Yahata et al. |
| 2002/0193535 A1 | 12/2002 | Meverden et al. |
| 2003/0032549 A1 | 2/2003 | Vogel |
| 2004/0024148 A1 | 2/2004 | Meverden |
| 2004/0152882 A1 | 8/2004 | Ekhom et al. |
| 2004/0260107 A1 | 12/2004 | Oberhoff et al. |
| 2005/0090384 A1 | 4/2005 | Wang et al. |
| 2006/0167195 A1 | 7/2006 | Resconi et al. |

FOREIGN PATENT DOCUMENTS

| | | |
|---|---|---|
| EP | 0 416 815 | 3/1991 |
| EP | 0 577 581 | 1/1994 |
| EP | 0 628 566 | 12/1994 |
| EP | 0 666 267 | 8/1995 |
| EP | 0 693 502 | 1/1996 |
| EP | 0 728 733 | 8/1996 |
| EP | 0 728 773 | 8/1996 |
| EP | 0 882 078 | 12/1998 |
| EP | 0 882 731 | 12/1998 |
| EP | 0 584 609 | 3/1999 |

(Continued)

OTHER PUBLICATIONS

Wild et al., *ansa*-Metallocene Derivatives, IV. Synthesis and Molecular Structures of Chiral *ansa*-Titanocene Derivatives with Bridged Tetrahydroindenyl Ligands, Journal of Organometallic Chemistry, 1982, vol. 232, pp. 233-247.

(Continued)

*Primary Examiner*—Caixia Lu
(74) *Attorney, Agent, or Firm*—Catherine L. Bell

(57) ABSTRACT

In a process for producing a propylene-based olefin homopolymer or copolymer, a monomer composition comprising propylene is contacted with a polymerization catalyst system under homogeneous polymerization conditions (such as solution, supersolution or supercritical conditions), wherein the polymerization catalyst system includes an activator and a bridged bis-indenyl transition metal (group 4) compound substituted with a carbazole (unsubstituted or substituted) at the 4 position.

37 Claims, 2 Drawing Sheets

FOREIGN PATENT DOCUMENTS

| | | |
|---|---|---|
| EP | 0 530 908 | 4/1999 |
| EP | 0 582 195 | 12/2000 |
| EP | 0 670 325 | 8/2002 |
| EP | 1 033 371 | 1/2004 |
| JP | 07-216011 | 8/1995 |
| JP | 08-127612 | 5/1996 |
| JP | 08-183814 | 7/1996 |
| JP | 08-301914 | 11/1996 |
| JP | 11-001508 | 1/1999 |
| JP | 11-060588 | 3/1999 |
| JP | 11-080183 | 3/1999 |
| JP | 11-171925 | 6/1999 |
| JP | 2002-037795 | 2/2002 |
| JP | 3323347 | 9/2002 |
| WO | WO 91/04257 | 4/1991 |
| WO | WO 95/04087 | 2/1995 |
| WO | WO 95/25757 | 9/1995 |
| WO | WO 96/04317 | 2/1996 |
| WO | WO 96/38458 | 12/1996 |
| WO | WO 99/26985 | 6/1999 |
| WO | WO 99/41289 | 8/1999 |
| WO | WO 99/42467 | 8/1999 |
| WO | WO 00/43406 | 7/2000 |
| WO | WO 00/69871 | 11/2000 |
| WO | WO 02/098930 | 12/2002 |
| WO | WO 03/000744 | 1/2003 |
| WO | WO 2004/013194 | 2/2004 |
| WO | WO 2004/033510 | 4/2004 |
| WO | WO 2004/060941 | 7/2004 |
| WO | WO 2006/130046 | 7/2006 |
| WO | WO 2006/097497 | 9/2006 |
| WO | WO 2006/097500 | 9/2006 |
| WO | WO 2006/134046 | 12/2006 |
| WO | WO 2007/107448 | 9/2007 |
| WO | WO 2007/116034 | 10/2007 |

OTHER PUBLICATIONS

Kato et al., Synthesis of Novel ansa-Metallocene Complex with Bridged Bis(indenyl) Ligand and Its Application for Olefin Polymerization, Studies in Surface and Catalysis, 1999, vol. 121 (Science and Technology in Catalysis 1998), pp. 473-476.

Coates et al., Oscillating Stereocontrol: A Strategy for the Synthesis of Thermoplastic Elastomeric Polypropylene, Science, 1995, vol. 267, pp. 217-219.

Johnston et al., Investigation of the Electrochemical Properties of Substituted Titanocene Dichlorides, Electrochemica Acta, 1995, vol. 40, pp. 473-477.

Waldbaum et al., Novel organoiron compounds resulting from the attempted syntheses of dibenzofulvalene complexes, Inorganica Chimica Acta, 1999, vol. 291, No. 1-2, pp. 109-126.

Finch et al., Substituent effects on the cleavage rates of titanocene metallacyclobutanes, Journal of the American Chemical Society, Washington, DC, US, 1998, vol. 110, pp. 2406-2413.

Siedle et al., Synthesis of Unsymmetrical Ansa-Fluorenyl Metallocenes, Journal of Molecular Catalysis, 2004, vol. 214, No. 2, pp. 187-198.

Rausch et al., The formation of ring-substituted titanocene derivatives containing chloro and carbomethoxy substituents, Journal of Organometallic Chemistry, Elsevier-Sequoia S.A. Lausanne, CH, Dec. 20, 1988, vol. 358, No. 1-3, pp. 161-168.

Schmid et al., Unbridged cyclopentadienyl-fluorenyl complexes of zirconium as catalysts for homogeneous olefin polymerization, Journal of Organometallic Chemistry, 1995, vol. 501, No. 1-2, pp. 101-106.

Alt et al., Syndiospezifische Polymerisation von Propylen: 2- und 2,7-substituierte Metallocenkomplex des Typs $(C_{13}H_8\text{-}nRnCR'_2C_5H_4)MCl_2$ ($n$ = 1,2; R = Alkoxy, Alkyl, Aryl, Hal; R' = Me, Ph; M = Zr, Hf)[1], Journal of Organometallic Chemistry, 1996, vol. 522, No. 1, pp. 39-54.

Alt et al., Syndiospecific Polymerization of Propylene: Synthesis of $CH_2$- and CHR-Bridged Fluorenyl-Containing Ligand Precursors for Metallocene Complexes of Type $(C_{13}H_8\text{-}nR'nCHR\text{-}C_5H_4)ZrCl_2$ (n = 0, 2; R = H, Alkyl; R' = H, Hal), Journal of Organometallic Chemistry, 1996, vol. 526, No. 2, pp. 295-301.

Kamigaito et al., Olefin polymerization with Me4Cp-amido complexes with electron-withdrawing groups, Journal of Polymer Science, Part A: Polymer Chemistry, 2000, vol. 38, No. S1, pp. 4649-4660.

Yano et al., Ethylene/1-Hexene Copolymerization with $Ph_2C(Cp)(Flu)ZrCl_2$ Derivatives: Correlation Between Ligand Structure and Copolymerization Behavior at High Temperature, Macromolecular Chemistry and Physics, 1999, vol. 200, No. 6, pp. 1542-1553.

Linnolahti, et al., Theoretical Study on the Factors Controlling the Accessibility of Cationic Metal Centers in Zirconocene Polymerization Catalysts, Macromolecules, 2000, vol. 33, 9205-9214.

Han et al., Permercuration of Ferrocenes and Ruthenocenes. New Approaches to Complexes Bearing Perhalogenated Cyclopentadienyl Ligands, Organometallics, 1994, vol. 13, No. 8, pp. 3009-3019.

Conway et al., Formation and Reactivity of Halogen Derivatives of ($\eta$5-Cyclopentadienyl)thallium, Organometallics, 1985, vol. 4, pp. 688-693.

Piccolrovazzi et al., Electronic Effects in Homogeneous Indenylzirconium Ziegler-Natta Catalysts, Organometallics, 1990, vol. 9, No. 12, pp. 3098-3105.

Ryabov et al., Zirconium Complexes with Cyclopentadienyl Ligands Involving Fused a Thiophene Fragment, Organometallics, 2002, vol. 21, 2842-2855.

Erker et al., Hydroboration of Bis(alkenylcyclopentadienyl)zirconium Dichlorides[1], Chemische Berichte, 1991, vol. 124, pp. 1301-1310.

Hassan et al., Aryl-Aryl Bond Formation One Century after the Discovery of the Ullmann Reaction, Chem. Rev., 2002, vol. 102, pp. 1359-1469.

Erker et al., Cp-Substituent Additivity Effects Controlling the Stereochemistry of the Propene Polymerization Reaction at Conformationally Unrestricted $(Cp\text{-}CHR^1R^2)_2ZrCl_2$/Methylalumoxane Catalysts, J. Am. Chem. Soc., 1991, vol. 113, pp. 7594-7602.

Ogasawara et al., Metathesis Route to Bridged Metallocenes, J. Am. Chem. Soc., 2002, vol. 124, pp. 9068-9069.

Bandy et al., Polymerisation of ethylene and propene using new chiral zirconium derivatives. Crystal structure of $[ZrL^1Cl_2][H_2L^1=(4S,5S)\text{-}trans\text{-}4,5\text{-}bis(1H\text{-}inden\text{-}1\text{-}ylmethyl)\text{-}2,2\text{-}dimethyl\text{-}1,3\text{-}dioxolane]$, J. Chem. Soc., Dalton Trans., 1991, pp. 2207-2216.

Schäfer et al., ansa-Metallocene Derivatives, XII. Diastereomeric Derivatisation and Enantiomer Separation of Ethylenebis(Tetrahydroindenyl)-Titanium and -Zirconium Dichlorides, Journal of Organometallic Chemistry, 1987, vol. 328, No. 1-2, pp. 87-99.

Rheingold et al., Preparation and Properties of Chiral Titanocene and Zirconocene Dichloride Complexes of a Chiral Ligand, Organometallics, 1992, vol. 11, pp. 1869-1876.

Hollis et al., Preparation and Properties of (S,S)-[Ti((R,R)-cyclacene)C12], a Chiral Strapped Bent Metallocene, Organometallics, 1992, vol. 11, pp. 2812-2816.

Erker et al., Synthesis of ansa-Metallocenes by Intramolecular Photochemical [2 +2] Cycloaddition of Bis(alkenylcyclopentadienyl)zirconium Complexes, Organometallics, 1993, vol. 12, pp. 2140-2151.

Larsonneur et al., Synthesis, Characterization, and Chemical Reactivity of Zirconium Dihydride $[(C_5H_4R)_2Zr(\mu\text{-}H)H]_2$ (R = $SiMe_3$, $CMe_3$). H/D Exchange Reactions of Anionic Species $[(C_5H_4R)_2ZrH_2]^-$. X-ray Crystal Structure of $[(C_5H_4SiMe_3)_2Zr(\mu\text{-}H)H]_2$, Organometallics, 1993, vol. 12, pp. 3216-3224.

Coates, et al., Oscillating Stereocontrol: A strategy for the Synthesis of Thermoplastic Elastomeric Polypropylene, Science, 1995, vol. 267, pp. 217-219.

Kravchenko, et al., Porpylene Polymerization with Chiral and Achiral Unbridged 2-Arylindene Metallocenes, Organometallics, 1997, vol. 16, pp. 3635-3639.

Dreier, et al., 2-Hetaryl-Substituted Bis(indenyl)zirconium Complexes as Catalyst Precursors for Elastomeric Polypropylene Formation, Organometallics, 2000, vol. 19, pp. 4095-4103.

Dreier, et al., Structural and Dynamic Features of Bis[2-(2-furyl)indenyl]zirconium Derivatives, Organometallics, 2001, vol. 20, pp. 5067-5075.

Dreier, et al., Group 4 metallocenes containing hetaryl substituents at their π-ligands: synthesis and characterization of the parent bis[2-(2-furyl)indenyl]zirconocene system, J. Organometallic Chem., 2001, vol. 622, pp. 143-148.

Dreier, et al., Conformational features of a furyl-substituted bis(tetrahydroindynyl)zirconium dichloride system, J. Phys. Org. Chem., 2002, vol. 15, pp. 582-589.

Yamazaki, et al., Novel High Performance *ansa*-Zirconocene Catalysts for Isosopecific Polymerization of Propylene, Chem. Letters, 1999, pp. 1311-1312.

Plenio, et al., Aminozirconocenes: a new class of zirconocenes with a nitrogen atom directly bonded to an $\eta^5$-cyclopentadienyl (indenyl) ligand, J. Organometallic Chem., 1996, vol. 519, pp. 269-272.

Knüppel, et al., Probing the Dynamic Features of Bis(aminocyclopentadienyl) and Bis(aminoindenyl) Zirconium Complexes, Organometallics, 2000, vol. 19, pp. 1262-1268.

PRODUCTION OF PROPYLENE-BASED POLYMERS

FIELD OF THE INVENTION

This invention relates to the production of propylene-based polymers.

BACKGROUND OF THE INVENTION

Various processes and catalysts exist for the homopolymerization or copolymerization of olefins, such as propylene. For many applications, it is desirable for a polyolefin to have a high Mw while having a relatively narrow Mw/Mn. A high Mw, when accompanied by a narrow Mw/Mn, provides a polyolefin with high strength properties.

Traditional Ziegler-Natta catalysts systems comprise a transition metal compound co-catalyzed by an aluminum alkyl and are typically capable of producing polyolefins having a high Mw, but with a broad Mw/Mn.

More recently metallocene catalyst systems have been developed wherein the transition metal compound has one or more cyclopentadienyl, indenyl or fluorenyl ring ligands (typically two). Metallocene catalyst systems, when activated with cocatalysts, such as alumoxane, are effective to polymerize monomers to polyolefins having not only a high Mw but also a narrow Mw/Mn.

Particular focus has been directed to metallocenes containing substituted, bridged indenyl rings, since these materials are particularly effective in producing isotactic propylene polymers having high isotacticity and narrow Mw/Mn. Considerable effort has been made toward obtaining metallocene produced propylene polymers having ever-higher molecular weight and melting point, while maintaining suitable catalyst activity. Researchers currently believe that there is a direct relationship between the way in which a metallocene is substituted, and the molecular structure of the resulting polymer. For the substituted, bridged indenyl type metallocenes, it is believed that the type and arrangement of substituents on the indenyl groups, as well as the type of bridge connecting the indenyl groups, determines such polymer attributes as molecular weight and melting point. Unfortunately, it is impossible at this time to accurately correlate specific substitution patterns with specific polymer attributes, though minor trends may be identified, from time to time.

For example, U.S. Pat. No. 5,840,644 describes certain metallocenes containing aryl-substituted indenyl derivatives as ligands, which are said to provide propylene polymers having high isotacticity, narrow molecular weight distribution and very high molecular weight. Likewise, U.S. Pat. No. 5,936,053 describes certain metallocene compounds said to be useful for producing high molecular weight propylene polymers. These metallocenes have a specific hydrocarbon substituent at the 2 position and an unsubstituted aryl substituent at the 4 position, on each indenyl group of the metallocene compound. Neither U.S. Pat. No. 5,840,644 nor 5,936,053 disclose carbazole substituents.

Also known in the art are unbridged indenyl based metallocenes having bulky substituents on the indenyl ligand, thus providing "fluxionality" to the activated catalyst. Metallocenes of this type are believed to produce "elastomeric" polypropylene. Science, 1995, 267, 217 discusses such catalysts.

U.S. Pat. No. 6,458,982 discloses compositions containing aromatic heterocyclic substituents on cyclopentadienyl or indenyl based metallocenes (non-bridged), but that are not bonded to the cyclopentadienyl or indenyl ring via the heteroatom. U.S. Pat. No. 6,169,051 B1 discloses compositions containing aromatic heterocyclic substituents on cyclopentadienyl or indenyl based metallocenes (bridged), but that are not bonded to the cyclopentadienyl or indenyl ring via the heteroatom.

References containing non-aromatic heterocyclic substituents on cyclopentadienyl or indenyl based metallocenes (bridged), and that are bonded to the cyclopentadienyl or indenyl ring via the heteroatom include: J. Organometallic Chem. 1996, 519, 269; Organometallics 2000, 19, 1262; U.S. Pat. No. 5,756,608; U.S. Pat. No. 5,585,509; and European Patent No. 0 670 325 B1.

U.S. Pat. No. 6,479,646 discloses bridged bis-indenyl metallocene compounds having cyclic heteroatom-containing substituents, but in all the compounds exemplified the substituents are bonded to the indenyl ligand via the 2-position of the cyclic heteroatom group.

U.S. Pat. No. 7,276,567 discloses bridged and unbridged indenyl metallocene compounds having cyclic heteroatom-containing substituents bonded to the indenyl ligand through a nitrogen or a phosphorus ring heteroatom.

JP3323347B2 discloses bridged bis-indenyl metallocenes in which the indenyl ligands are substituted at the 4-position by pyrrol-1-yl substituents including ring-fused hydrocarbyl substituted pyrrol-1-yl substituents. When combined with a cocatalyst, the metallocenes are said to effective in producing high molecular weight α-olefin polymers over a temperature range of −78° C. to 200° C., preferably −20° C. to 100° C.

US 2002/0002261 discloses bis[2-(2-furyl)indenyl]zirconium dichloride and or bis[2-(2-furyl)-4-phenylindenyl]zirconium dichloride for use in making polypropylene. Likewise U.S. 2001/0031834 discloses polypropylene compositions made using indenyl metallocenes, which can be substituted with hetero-aromatic groups, preferably a 2-furyl group, a 3-furyl group, a 2-thienyl group, a 3-thienyl group, a 2-pyrrolyl group, a 3-pyrrolyl group, a 2-pyridyl group, a 3-pyridyl group, a 4-pyridyl group, a benzofuryl group, a benzothienyl group, a 3-indolyl group, a 1-quinolyl group, or a 3-quinolyl group. US 2001/0053833 discloses compounds that are bridged indenes that have heterocyclic substituents on the indene with the proviso that at least one of the heterocyclic substituents has another substituent on it. Examples are all with 2-substituted heterocycles including bis(2-(2-(5-methyl)-furyl)-4,5-benzoindenyl)zirconium dichloride, bis(2-(2-(5-phenyl)-furyl)-indenyl)zirconium dichloride, rac-dimethylsilylene bis(2-(2-(5-methyl)furyl)-4-phenylindenyl) zirconium dichloride, and rac-dimethylsilylene bis(2-(2-(5-methyl)furyl)-indenyl)zirconium dichloride.

WO 2006/097497 discloses bridged bis-indenyl metallocene compounds, in which each indenyl ligand is substituted at its 2-position with a $C_1$-$C_{40}$ hydrocarbon radical and at its 4 position with an aromatic 5 or 6 membered ring.

It is also desirable to produce polypropylene in a homogeneous process such as a solution or a supercritical process. High polymerization temperature is useful for the homogeneous process to maintain polypropylene produced in solution and not phase separate from the polymerization medium. However, for almost all catalysts, polypropylene produced at higher temperatures has lower molecular weight and lower melting temperature, and hence poorer end-use properties. It is challenging to producing polypropylene with high molecular weight and high melting temperature in a homogeneous process.

According to the present invention, it has now been found certain N-bonded carbazol-9-yl substituted bridged bis-indenyl metallocene compounds, when combined with a suitable cocatalyst, are effective under solution (including supercritical) polymerization conditions to produce olefin polymers with exceptionally high molecular weight. Surprisingly, propylene polymers produced using these N-bonded carbazol-9-yl substituted metallocene compounds exhibit significantly higher molecular weight than similar polymers produced using the equivalent N-bonded pyrrol-1-yl and indol-1-yl substituted metallocenes. Also surprising is the higher polymer melting point for propylene polymers produced using these carbazol-9-yl substituted metallocene compounds relative to those produced using the equivalent pyrrol-1-yl and indol-1-yl substituted metallocenes.

SUMMARY OF THE INVENTION

This invention relates to a process for producing a propylene-based olefin homopolymer or copolymers, the process comprising contacting propylene and optionally at least one other olefinically unsaturated monomer with a polymerization catalyst system under homogeneous polymerization condition (such as solution, supersolution, or supercritical conditions), wherein the polymerization catalyst system includes a compound of the formula (I):

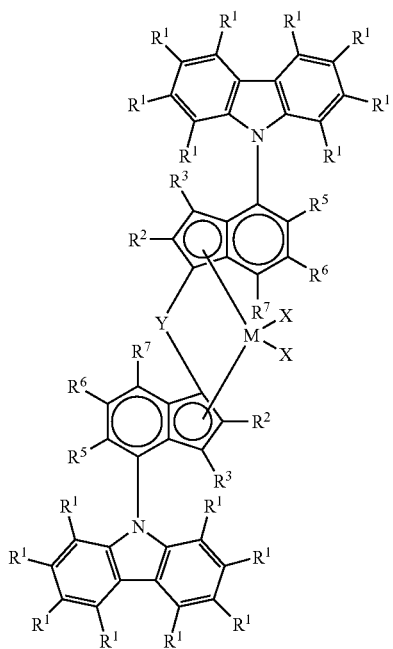

wherein

M is a transition metal selected from group 4 of the Periodic Table of the Elements;

each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$ and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallocycle ring containing from about 3 to about 20 carbon atoms; or both together can be an olefin, diolefin or aryne ligand; or both X may, independently, be a halogen, alkoxide, aryloxide, amide, phosphide or other univalent anionic ligand; or both X can also be joined to form a anionic chelating ligand. Conveniently, each X is a halogen or hydrocarbyl.

In preferred embodiment, the monomer composition comprises propylene and optionally at least one $C_4$ to $C_{20}$ α-olefin and the polymerization is conducted at a pressure in excess of 5 MPa, especially under supercritical conditions including a pressure of between 15 MPa and 1500 MPa.

DEFINITIONS

Figure 1:
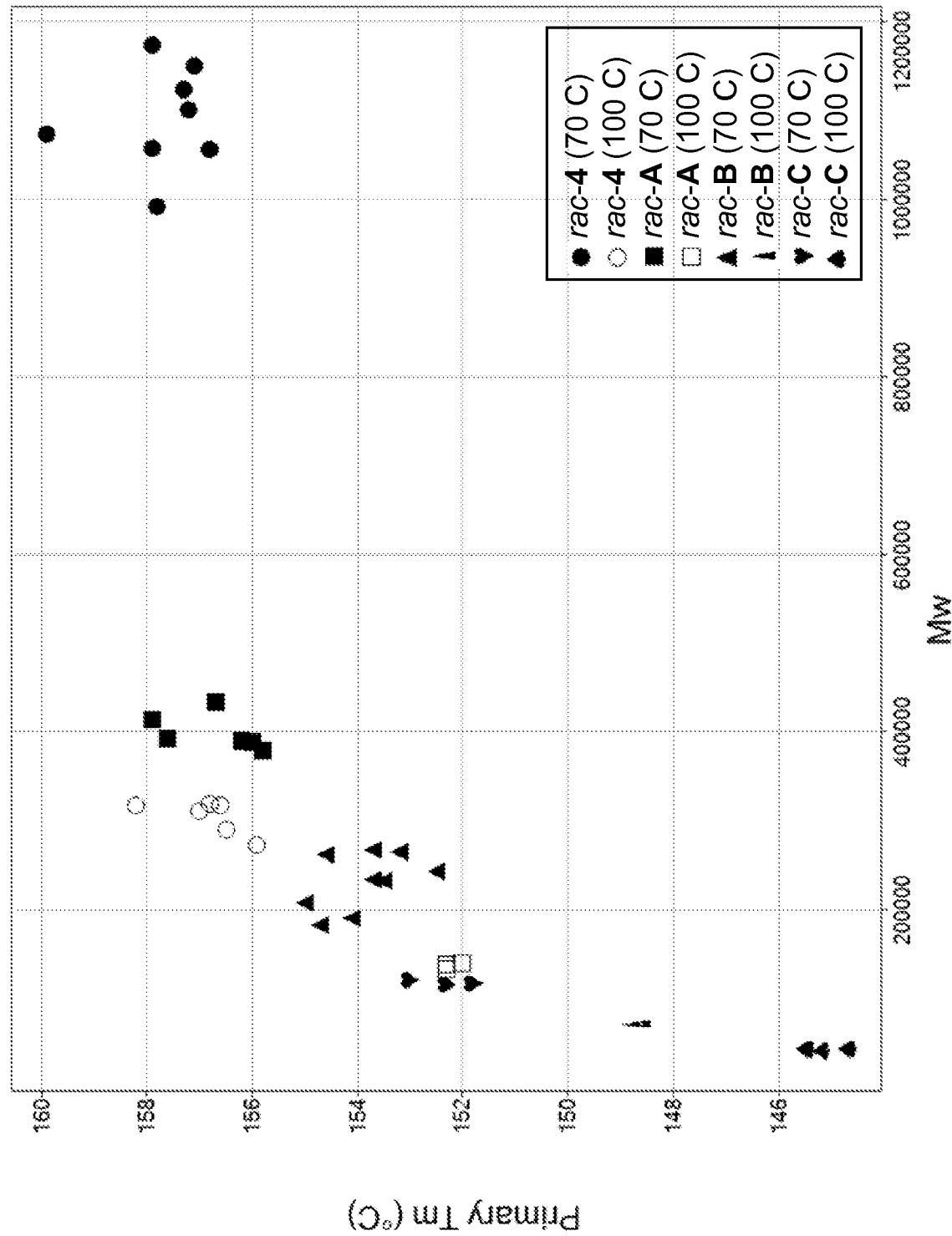
FIG. 1 is a graph of the polymer weight average molecular weight (g/mol) vs. the primary melting temperature (° C.) for the polypropylene products produced according to polymerization Examples 1-15 and comparative examples C1-C27. The legend indicates the catalyst used in addition to the polymerization temperature (° C.).

As used herein, the numbering scheme for the Periodic Table groups is the new notation as set out in CHEMICAL AND ENGINEERING NEWS, 63(5), 27 (1985).

As used herein, Me is methyl, t-Bu and $^tBu$ are tertiary butyl, iPr and $^iPr$ are isopropyl, Cy is cyclohexyl, THF (also referred to as thf) is tetrahydrofuran, MW is molecular weight, Mw is weight average molecular weight, Mn is number average molecular weight, and Mz is z average molecular weight, and Ph is phenyl.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic, and include substituted hydrocarbyl radicals, halocarbyl radicals, and substituted halocarbyl radicals, silylcarbyl radicals, and germylcarbyl radicals as these terms are defined below.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N($R^*$)—, =N—, —P($R^*$)—, =P—, —As($R^*$)—, =As—, —Sb($R^*$)—, =Sb—, —B($R^*$)—, =B—, —Si($R^*$)$_2$—, —Ge($R^*$)$_2$—, —Sn($R^*$)$_2$—, —Pb($R^*$)$_2$— and the like, where $R^*$ is independently a hydrocarbyl or halocarbyl radical, and two or more $R^*$ may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e g. $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N($R^*$)—, =N—, —P($R^*$)—, =P—, —As($R^*$)—, =As—, —Sb($R^*$)—, =Sb—, —B($R^*$)—, =B—, —Si($R^*$)$_2$—, —Ge($R^*$)$_2$—, —Sn($R^*$)$_2$—, —Pb($R^*$)$_2$— and the like, where $R^*$ is independently a hydrocarbyl or halocarbyl radical provided that at least one halogen atom remains on the original halocarbyl radical. Additionally, two or more $R^*$ may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where $R^*$ is independently a hydrocarbyl or halocarbyl radical and two or more $R^*$ may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like where $R^*$ is independently a hydrocarbyl or halocarbyl radical and two or more $R^*$ may join together to form a substituted or unsubstituted saturated, partially unsaturated or aromatic cyclic or polycyclic ring structure.

For nomenclature purposes, the following numbering scheme is used for an indenyl ring, drawn below as an anionic ligand. Positions 1 and 3 are equivalent, 4 and 7 are equivalent, and 5 and 6 are equivalent.

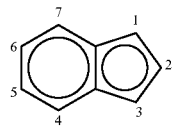

Standard numbering systems are used for heterocyclic substituents. For example, the following numbering of positions is used for pyrrole, indole and carbazole:

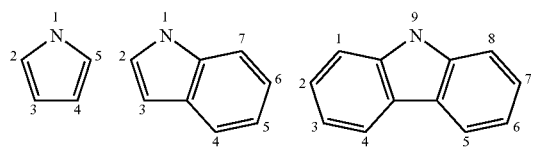

In the context of this document, "homopolymerization" would produce a polymer made from one monomer. For example, homopolymerization of propylene would produce homopolypropylene. Likewise, "copolymerization" would produce polymers with more than one monomer type.

Substituted α-olefins (also called functional group containing α-olefins) include those containing at least one non-carbon group 13 to 17 atom bound to a carbon atom of the substituted α-olefin where such substitution if silicon may be adjacent to the double bond or terminal to the double bond, or anywhere in between, and where inclusion of non-carbon and non-silicon atoms such as for example B, O, S, Se, Te, N, P, Ge, Sn, Pb, As, F, Cl, Br, or I, are contemplated, where such non-carbon or non-silicon moieties are sufficiently far removed from the double bond so as not to interfere with the coordination polymerization reaction with the catalyst and so to retain the generally hydrocarbyl characteristic. By sufficiently far removed from the double bond we intend that the number of carbon atoms, or the number of carbon and silicon atoms, separating the double bond and the non-carbon or non-silicon moiety is preferably 6 or greater, e.g. 7, or 8, or 9, or 10, or 11, or 12, or 13, or 14 or more. The number of such carbon atoms, or carbon and silicon atoms, is counted from immediately adjacent to the double bond to immediately adjacent to the non-carbon or non-silicon moiety. Examples include allyltrimethylsilane, divinylsilane, 8,8,8-trifluoro-1-octene, 8-methoxyoct-1-ene, 8-methylsulfanyloct-1-ene, 8-dimethylaminooct-1-ene, or combinations thereof. The use of functional group-containing α-olefins where the functional group is closer to the double bond is also within the scope of embodiments of the invention when such olefins may be incorporated in the same manner as are their α-olefin analogs. See, "Metallocene Catalysts and Borane Reagents in The Block/Graft Reactions of Polyolefins", T. C. Chung, et al, *Polym. Mater. Sci. Eng.*, v. 73, p. 463 (1995), and the masked α-olefin monomers of U.S. Pat. No. 5,153,282. Such monomers permit the preparation of both functional-group containing copolymers capable of subsequent derivatization, and of functional macromers which may be used as graft and block type polymeric segments. Copolymerization can also incorporate α-olefinic macromonomers of up to 2000 mer units.

The term "catalyst system" means a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety. The transition metal compound may be neutral as in a precatalyst, or a charged species with a counter ion as in an activated catalyst system.

Catalyst precursor is also often referred to as precatalyst, catalyst, catalyst compound, transition metal compound or transition metal complex. These words are used interchangeably. Activator and cocatalyst are also used interchangeably. A scavenger is a compound that is typically added to facilitate polymerization by scavenging impurities. Some scavengers may also act as activators and may be referred to as co-activators. A co-activator that is not a scavenger may also be used in conjunction with an activator in order to form an active catalyst. In some embodiments a co-activator can be pre-mixed with the transition metal compound to form an alkylated transition metal compound, also referred to as an alkylated invention compound.

A dense fluid is a liquid or supercritical fluid having a density of at least 300 kg/m$^3$.

The solid-fluid phase transition temperature is defined as the temperature below which a solid polymer phase separates from the homogeneous polymer-containing fluid medium at a given pressure. The solid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.

The solid-fluid phase transition pressure is defined as the pressure below which a solid polymer phase separates from the polymer-containing fluid medium at a given temperature. The solid-fluid phase transition pressure is determined by pressure reduction at constant temperature starting from pressures at which the polymer is fully dissolved in the fluid medium. The phase transition is observed as the system becoming turbid, when measured using the method described below for determining cloud point.

The fluid-fluid phase transition pressure is defined as the pressure below which two fluid phases—a polymer-rich phase and a polymer lean phase—form at a given temperature. The fluid-fluid phase transition pressure can be determined by pressure reduction at constant temperature starting from pressures at which the polymer is fully dissolved in the fluid medium. The phase transition is observed as the system becoming turbid, when measured using the method described below for determining cloud point.

The fluid-fluid phase transition temperature is defined as the temperature below which two fluid phases—a polymer-rich phase and a polymer lean phase—form at a given pressure. The fluid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.

The cloud point is the pressure below which, at a given temperature, the polymerization system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium laser through the selected polymerization system in a cloud point cell onto a photocell and recording the pressure at the onset of rapid increase in light scattering for a given temperature. Cloud point pressure is the point at which at a given temperature, the polymerization system becomes turbid. Cloud point temperature is the point at which at a given pressure, the polymerization system becomes turbid. It should be noted that although both the cloud point pressure and cloud point temperature are well-defined physical properties, in the area of polymer engineering, "cloud point" typically refers to the cloud point pressure.

When a polymer or oligomer is referred to as comprising an olefin, the olefin present in the polymer or oligomer is the polymerized or oligomerized form of the olefin. An oligomer is defined to be compositions having 2-120 monomer units. A polymer is defined to be compositions having 121 or more monomer units.

A polymerization system is defined to be monomer(s) plus comonomer(s) plus polymer(s) plus optional inert solvent(s)/diluent(s) plus optional scavenger(s) in the reactor. Note that for the sake of convenience and clarity, the catalyst system is always addressed separately in the present discussion from other components present in a polymerization reactor.

To be in the supercritical state, a substance must have a temperature above its critical temperature (Tc) and a pressure above its critical pressure (Pc). The critical temperature and pressure vary with composition of polymerization medium. If not measured, critical temperatures (Tc) and critical pressures (Pc) are those found in the Handbook of Chemistry and Physics, David R. Lide, Editor-in-Chief, 82nd edition 2001-2002, CRC Press, LLC. New York, 2001. In particular, the Tc and Pc of propylene are 364.9 K and 4.6 MPa. In the event a Tc and/or Pc cannot be measured for a given system, then the Tc and/or Pc will be deemed to be the Tc and/or Pc of the mole fraction weighted averages of the corresponding Tc's and Pc's of the system components.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization system, such as an inert solvent or monomer(s) or their blends. A solution polymerization is typically a homogeneous liquid polymerization system.

A supercritical polymerization means a polymerization process in which the polymerization system is in a dense (i.e. its density is 300 kg/m$^3$ or higher), supercritical state.

A bulk polymerization means a polymerization process in which the monomers and/or comonomers being polymerized are used as a solvent or diluent using little or no inert solvent as a solvent or diluent. A small faction of inert solvent might be used as a carrier for catalyst and scavenger. A bulk polymerization system contains less than 25 wt % of inert solvent or diluent.

A homogeneous polymerization or a homogeneous polymerization system is a polymerization system where the polymer product is dissolved in the polymerization medium. Such systems are not turbid as described in J. Vladimir Oliveira, C. Dariva and J. C. Pinto, Ind. Eng, Chem. Res. 29, 2000, 4627. For purposes of this invention and the claims thereto, turbidity is measured by shining a helium laser through the selected polymerization system in a cloud point cell onto a photocell and determining the point of the onset of rapid increase in light scattering for a given polymerization system. Uniform dissolution in the polymerization medium is indicated when there is little or no light scattering (i.e. less than 5%).

A super solution polymerization or supersolution polymerization system is one where the polymerization occurs at a temperature of 65° C. to 150° C. and a pressure of between 250 to 5,000 psi (1.72 to 34.5 MPa), having: 1) 0 to 20 wt % of one or more comonomers (based upon the weight of all monomers and comonomers present in the feed) selected from the group consisting of ethylene and $C_4$ to $C_{12}$ olefins, 2) from 20 to 65 wt % diluent or solvent, based upon the total weight of feeds to the polymerization reactor, 3) 0 to 5 wt % scavenger, based upon the total weight of feeds to the polymerization reactor, 4) the olefin monomers and any comonomers are present in the polymerization system at 15 wt % or more, 5) the polymerization temperature is above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system.

Unless otherwise noted, all molecular weight units (e.g., Mw, Mn, Mz) are g/mol and all ppm's are wt ppm. Unless otherwise noted all melting points ($T_m$) are DSC second melt.

DETAILED DESCRIPTION OF THE EMBODIMENTS

Described herein is a process for producing homopolymers and copolymers of propylene using a catalyst system which is effective at the relatively higher temperatures required for homogeneous (including solution, supersolution, and supercritical) polymerization conditions to produce propylene polymers with exceptionally high Mw and high melting temperature.

Catalyst System

In particular the catalyst system employed in the present process comprises (a) a catalyst precursor and (b) an activator, wherein the catalyst precursor comprises a bridged bis-indenyl metallocene compound obeying the formula:

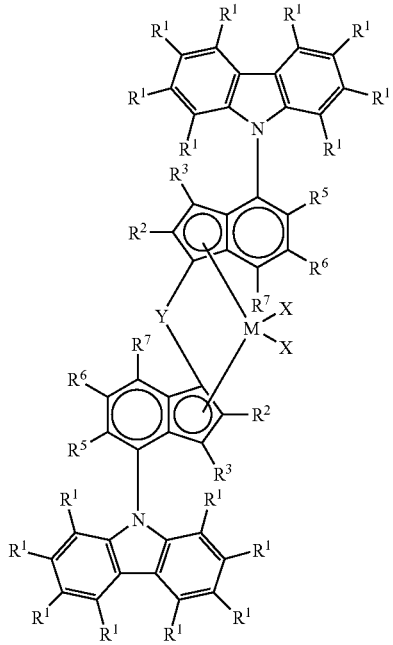

wherein

M is group 4 Metal, preferably titanium, zirconium or hafnium, especially zirconium;

each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$ and $R^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallocycle ring containing from about 3 to about 20 carbon atoms; or both together can be an olefin, diolefin or aryne ligand; or both X may, independently, be a halogen, alkoxide, aryloxide, amide, phosphide or other univalent anionic ligand; or both X can also be joined to form a anionic chelating ligand.

Suitable radicals for the each of the groups $R^1$, $R^2$, $R^3$, $R^5$, $R^6$ and $R^7$ are selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis(trifluoromethyl)phenyl; and from all isomers of benzyl, and all isomers of hydrocarbyl substituted benzyl including methylbenzyl, dimethylbenzyl.

In some embodiments of the invention, it is preferred that each $R^1$, $R^2$, $R^3$, $R^5$, $R^6$ and $R^7$ is selected from, hydrogen, methyl, ethyl, n-propyl, iso-propyl, n-butyl, sec-butyl, iso-butyl, tert-butyl, pentyl, hexyl, cyclohexyl, phenyl, or trifluoromethyl.

In some embodiments $R^2$, $R^3$, $R^5$, $R^6$ and $R^7$ on adjacent atoms may join together to form a substituted or unsubstituted saturated, partially unsaturated or aromatic cyclic or polycyclic ring structure.

In another embodiment, each $R^1$ is hydrogen and each of $R^2$, $R^3$, $R^5$, $R^6$ and $R^7$ is, independently, hydrogen, or a hydrocarbyl group having 1 to 10 carbon atoms. In one embodiment, $R^2$ is methyl and each of $R^1$, $R^3$, $R^5$, $R^6$, and $R^7$ is hydrogen.

In another embodiment, Y is selected from $R'_2C$, $R'_2Si$, $R'_2Ge$, $R'_2CCR'_2$, $R'_2CCR'_2CR'_2$, $R'C$=$CR'$, $R'C$=$CR'CR'_2$, $R'_2CSiR'_2$, $R'_2SiSiR'_2$, $R'_2CSiR'_2CR'_2$, $R'_2SiCR'_2SiR'_2$, $R'C$=$CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C$=$CR'GeR'_2$, $R'B$, $R'_2C$—$BR'$, $R'_2C$—$BR'$—$CR'_2$, $R'N$, $R'_2C$—$NR'$, $R'_2C$—$NR'$—$CR'_2$, $R'P$, $R'_2C$—$PR'$, and $R'_2C$—$PR'$—$CR'_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for the bridging group Y include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

Preferred examples for the bridging group Y include $CH_2$, $CH_2CH_2$, $C(CH_3)_2$, $SiMe_2$, $SiPh_2$, $SiMePh$, $Si(CH_2)_3$, and $Si(CH_2)_4$.

Suitable examples for X include chloride, bromide, fluoride, iodide, hydride, and $C_1$ to $C_{20}$ hydrocarbyls, preferably methyl, ethyl, propyl, butyl, pentyl, hexyl, phenyl, benzyl, and all isomers thereof, or two X together are selected from $C_4$ to $C_{10}$ dienes, preferably butadiene, methylbutadiene, pentadiene, methylpentadiene, dimethylpentadiene, hexadiene, methylhexadiene, dimethylhexadiene, or from $C_1$ to $C_{10}$ alkylidenes, preferably methylidene, ethylidene, propylidene, or from $C_3$ to $C_{10}$ alkyldiyls, preferably propandiyl, butandiyl, pentandiyl, and hexandiyl.

Preferred examples for X are chloride and methyl.

The catalyst precursor described above is preferably present in the d/l enantiomeric (racemic) form, although may in some cases contain small amounts of the meso isomer.

In another embodiment, the catalyst precursor described above is associated with one or more molecules of a Lewis base such as THF or diethylether. The Lewis base may be datively bonded to the metal center, or associated to the molecule though a weaker interaction such as via Van der Waals forces. Solvent molecules such as toluene or benzene my also be associated with the catalyst precursor by such weaker interactions.

Synthesis of the present catalyst precursor can readily be achieved by synthetic procedures described in U.S. Pat. No. 7,276,567. Described within are Pd-phosphine catalyzed coupling reactions between bromo substituted indenes and nitrogen containing heterocycles wherein the products produced are heterocyclic substituted indenes wherein the heterocyclic substituent is bonded to the indene via the nitrogen atom. Starting reagents such as 2-methyl-4-bromoindene can now readily be prepared in a two pot reaction procedure starting from commercially available reagents (see for example the preparation of complex 25 in U.S. Pat. No. 7,276, 567). In a subsequent reaction, 2-methyl-4-bromoindene can be coupled with heterocycles such as pyrrole or indole and now carbazole (herein described in the experimental section) using Pd-phosphine coupling catalysis. (Previously, formation of compounds such as 2-methyl-4-(indol-1-yl)indene was a seven pot reaction procedure as described in JP3323347B2 and which did not readily lend itself to making other heterocyclic substituted indenes in only a few synthetic steps.) In this coupling reaction, 2-methyl-4-bromoindene reacts with, for example, carbazole, to form a new substituted indene compound where the carbazole is bonded to indene through the heteroatom producing 2-methyl-4-(carbazol-9-yl)indene. Two equivalents of 2-methyl-4-(carbazol-9-yl)indene can be lithiated and reacted with one equivalent of dimethylsilyldichloride to from the catalyst precursor ligand, bis[2-methyl-4-(carbazol-9-yl)inden-1-yl](dimethyl)silane. This complex can subsequently be doubly deprotonated and reacted with a metal halide such as $ZrCl_4(THF)_2$ to form rac and meso isomers of dimethylsilylene-bis[2-methyl-4-(carbazol-9-yl)inden-1-yl]zirconium dichloride which can be separated by typical extraction and recrystallization procedures. Alternatively, the catalyst precursor ligand can be reacted with a metal amide such as $Zr(NMe_2)_4$ to form rac and meso isomers of dimethylsilylene-bis[2-methyl-4-(carbazol-9-yl)inden-1-yl]zirconium bis(dimethylamide). This complex can be used as a precatalyst or converted to a dihalide complex by reaction with an acid halide such as HCl or silylhalide such as $Me_3SiCl$. Similarly, the catalyst precursor ligand can be reacted with chelating amide metal halide such as $[PhN(CH_2)_3NPh]ZrCl_2$ to form rac-dimethylsilylene-bis[2-methyl-4-(carbazol-9-yl)inden-1-yl]zirconium($N^1,N^3$-diphenylpropane-1,3-diamide). This complex can be used as a precatalyst or converted to a dihalide complex by reaction with an acid halide such as HCl. The demethylated version of the complex, dimethylsilylene-bis[2-methyl-4-(carbazol-9-yl)inden-1-yl]zirconium dimethyl, can be readily made by reaction of the zirconium dichloride complex with a Grinard such as MeMgCl, or other methylating reagents.

In a preferred embodiment, the catalyst compound is selected from the group consisting of dimethylsilylene-bis[2-methyl-4-(carbazol-9-yl)inden-1-yl]zirconium dimethyl, dimethylsilylene-bis[2-methyl-4-(carbazol-9-yl)inden-1-yl] zirconium dibenzyl, dimethylsilylene-bis[2-methyl-4-(carbazol-9-yl)inden-1-yl]zirconium dichloride, dimethylsilylene-bis[2-methyl-4-(carbazol-9-yl)inden-1-yl]zirconium dibromide, dimethylsilylene-bis[2-methyl-4-(carbazol-9-yl) inden-1-yl]zirconium difluoride, dimethylsilylene-bis[2-methyl-4-(carbazol-9-yl)inden-1-yl]zirconium bis(dimethylamide), and dimethylsilylene-bis[2-methyl-4-(carbazol-9-yl) inden-1-yl]zirconium ($N^1,N^3$-diphenylpropane-1,3-diamide).

In a more preferred embodiment, the catalyst compound is selected from the group consisting of dimethylsilylene-bis[2-methyl-4-(carbazol-9-yl)inden-1-yl]zirconium dimethyl and dimethylsilylene-bis[2-methyl-4-(carbazol-9-yl)inden-1-yl] zirconium dichloride.

In addition, the invention catalyst may be used in conjunction with a second catalyst including traditional Ziegler-Natta catalysts, a different metallocene catalyst, monocyclopentadienyl amido group 4 catalysts, and other non-metallocene catalysts including both early and late transition metal catalysts. Mixed catalyst systems can be employed to alter or select desired physical or molecular properties of the polymer being produced. For example, mixed catalyst systems can control the Mw/Mn of isotactic polypropylene. Mixed-catalyst systems can be used to tailor the composition distribution of copolymers with high catalyst productivity. These systems can also be used with diene incorporation to facilitate long chain branching using mixed catalyst systems and high levels of vinyl terminated polymers.

In addition to the catalyst precursor described above, the catalyst system employed in the present process employs an activator preferably selected from alumoxanes, such as methyl alumoxane, modified methyl alumoxane, ethyl alumoxane, iso-butyl alumoxane and the like; Lewis acid activators such as triphenyl boron, tris-perfluorophenyl boron, tris-perfluoronaphthylboron, tris-perfluorophenyl aluminum and the like; and ionic activators such as N,N-dimethylanilinium tetrakis perfluorophenyl borate, triphenyl carbonium tetrakis perfluorophenyl borate, N,N-dimethylanilinium tetrakis perfluoronaphthyl borate, N,N-dimethylanilinium tetrakis perfluorophenyl aluminate and the like.

A co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum. Co-activators are typically only used in combination with Lewis acid activators and ionic activators when the pre-catalyst is not a dihydrocarbyl or dihydride complex.

The alumoxane component useful as an activator typically is an oligomeric aluminum compound represented by the general formula $(R^x$—Al—O$)_n$, which is a cyclic compound, or $R^x(R^x$—Al—O$)_n$AlR$^x{}_2$, which is a linear compound. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred.

When an alumoxane or modified alumoxane is used, the catalyst-precursor-to-activator molar ratio is from about 1:3000 to 10:1; alternatively, 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-catalyst-precursor ratio is 1:1 molar ratio.

Ionic activators (at times used in combination with a co-activator) may be used in the practice of this invention. Preferably, discrete ionic activators such as [Me$_2$PhNH][B(C$_6$F$_5$)$_4$], [Ph$_3$C][B(C$_6$F$_5$)$_4$], [Me$_2$PhNH][B((C$_6$H$_3$-3,5-(CF$_3$)$_2$))$_4$], [Ph$_3$C][B((C$_6$H$_3$-3,5-(CF$_3$)$_2$))$_4$], [NH$_4$][B(C$_6$H$_5$)$_4$], [Me$_2$PhNH][B(C$_{10}$F$_7$)$_4$], [Ph$_3$C][B(C$_{10}$F$_7$)$_4$], or Lewis acidic activators such as B(C$_6$F$_5$)$_3$, B(C$_{10}$F$_7$)$_3$ or B(C$_6$H$_5$)$_3$ can be used (where C$_6$F$_5$ is prefluorophenyl, C$_{10}$F$_7$ is perfluoronapthyl, C$_6$F$_3$-3,5-(CF$_3$)$_2$ is perfluoro-m-xylene). Preferred co-activators, when used, are alumoxanes such as methyl alumoxane, modified alumoxanes such as modified methyl alumoxane, and aluminum alkyls such as tri-isobutyl aluminum, and trimethyl aluminum.

It is within the scope of this invention to use an ionizing or stoichiometric activator, neutral or ionic, such as tri(n-butyl) ammonium tetrakis(pentafluorophenyl) borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be prepared by reacting a transition metal compound with an activator, such as B(C$_6$F$_6$)$_3$, which upon reaction with the hydrolyzable ligand (X) of the transition metal compound forms an anion, such as ([B(C$_6$F$_5$)$_3$(X)]$^-$), which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible NCA which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible NCAs useful herein have been disclosed in EPA 277,003 and EPA 277,004. They are: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula: $(L^{}\text{-}H)_d^+(A^{d-})$ wherein $L^{}$ is an neutral Lewis base; H is hydrogen; $(L^{}\text{-}H)^+$ is a Bronsted acid; $A^{d-}$ is an NCA having the charge d−; and d is an integer from 1 to 3. The cation component, $(L^{}\text{-}H)_d^+$ may include Bronsted acids such as protons or protonated Lewis bases or reducible Lewis acids capable of protonating or abstracting a moiety, such as an alkyl or aryl, from the pre-catalyst after alkylation. The activating cation $(L^{}\text{-}H)_d^+$ may be a Bronsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene, and mixtures thereof. The activating cation $(L^{}\text{-}H)_d^+$ may also be a moiety such as silver, tropylium, carbeniums, ferroceniums and mixtures, preferably carboniums and ferroceniums; most preferably triphenyl carbonium.

The anion component $A^{d-}$ include those having the formula $[M^{k+}Q_n]^{d-}$ wherein k is an integer from 1 to 3; n is an integer from 2-6; n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in combination with a co-activator in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(tertbutyl) ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl (tert-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(tert-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis (trifluoromethyl)phenyl)borate, tri(n-butyl)ammonium tetrakis(3,5-bis(trifluoromethyl)phenyl)borate, tri(tert-butyl) ammonium tetrakis(3,5-bis(trifluoromethyl)phenyl)borate, N,N-dimethylanilinium tetrakis(3,5-bis(trifluoromethyl) phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, and dialkyl ammonium salts such as: di-(isopropyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis (pentafluorophenyl)borate, triethylsilylium tetrakis (pentafluorophenyl)borate, benzene(diazonium) tetrakis (pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis(2,3,4,6-tetrafluorophenyl)borate, benzene(diazonium) tetrakis-(2,3,4,6-tetrafluorophenyl)borate, tropillium tetrakis (perfluoronaphthyl)borate, triphenylcarbenium tetrakis(perfluoronaphthyl)borate, triphenylphosphonium tetrakis(perfluoronaphthyl)borate, triethylsilylium tetrakis (perfluoronaphthyl)borate, benzene(diazonium) tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium) tetrakis(3,5-bis(trifluoromethyl)phenyl)borate.

Most preferably, the ionic stoichiometric activator $(L^{**}-H)_d^+(A^{d-})$ is N,N-dimethylanilinium tetrakis(perfluorophenyl)borate, N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, or triphenylcarbenium tetra(perfluorophenyl)borate.

The catalyst precursors employed in the present process can also be activated with cocatalysts or activators that comprise NCAs containing metalloid-free cyclopentadienide ions. These are described in U.S. Patent Publication 2002/0058765 A1, published on 16 May 2002, and for the instant invention, require the addition of a co-activator to the catalyst pre-cursor.

The term "non-coordinating anion" (NCA) means an anion that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. NCAs useful in accordance with this invention are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts sometimes use scavengers such as but not limited to tri-iso-butyl aluminum, tri-n-octyl aluminum, tri-n-hexyl aluminum, triethylaluminum or trimethylaluminum.

The present process also can employ cocatalyst compounds or activator compounds that are initially neutral Lewis acids but form a cationic metal complex and a noncoordinating anion, or a zwitterionic complex upon reaction with the alkylated transition metal compounds. The alkylated invention compound is formed from the reaction of the catalyst pre-cursor and the co-activator. For example, tris(pentafluorophenyl) boron or aluminum act to abstract a hydrocarbyl ligand to yield an invention cationic transition metal complex and stabilizing noncoordinating anion, see EP-A-0 427 697 and EP-A-0 520 732 for illustrations of analogous group 4 metallocene compounds. Also, see the methods and compounds of EP-A-0 495 375. For formation of zwitterionic complexes using analogous group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391-1434 (2000).

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl)boron, and mixtures of trimethyl aluminum with dimethylanilinium tetrakis(pentafluorophenyl)borate or tris(pentafluorophenyl)boron.

In some embodiments, scavenging compounds are used with stoichiometric activators. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, isomers thereof, and each Z is independently $R^x$ or a different univalent anionic ligand such as halogen (Cl, Br, I), alkoxide ($OR^x$) and the like. Most preferred aluminum alkyls include triethylaluminum, diethylaluminum chloride, tri-isobutylaluminum, tri-n-octylaluminum, tri-n-hexylaluminum, trimethylaluminum and the like. Preferred boron alkyls include triethylboron. Scavenging compounds may also be alumoxanes and modified alumoxanes including methylalumoxane and modified methylalumoxane.

Monomers

The present process is particularly effective for the polymerization of propylene, either alone or in combination with at least one other olefinically unsaturated monomer, such as ethylene or a $C_4$ to $C_{20}$ α-olefin, and particularly a $C_4$ to $C_{20}$ α-olefin. Examples of preferred α-olefins include butene-1, pentene-1, hexene-1, heptene-1, octene-1, nonene-1, decene-1, dodecene-1,4-methylpentene-1,3-methylpentene-1,3,5,5-trimethylhexene-1, and 5-ethylnonene-1. In a preferred embodiment the comonomer(s) are present at up to 50 mol %, preferably from 0.01 to 40 mol %, preferably 1 to 30 mol %, preferably from 5 to 20 mole %. In a preferred embodiment, the copolymer comprises ethylene, butene, pentene, hexene, octene, nonene, decene, undecene, and or dodecene present at from 0.5 to 20 wt %, preferably 1 to 15 wt %. In another embodiment, the monomer composition consists essentially of propylene, preferably 0 wt % comonomer is present in the polymerization reactor. In another embodiment, the monomer composition comprises propylene and at least one other olefinically unsaturated monomer, especially ethylene or a $C_4$ to $C_{20}$ α-olefin.

In some embodiments the monomer mixture may also comprise one or more dienes at up to 10 Wt %, such as from 0.00001 to 1.0 Wt %, for example from 0.002 to 0.5 Wt %, such as from 0.003 to 0.2 Wt %, based upon the monomer mixture.

Particularly preferred propylene copolymers produced herein include polymers of propylene with α-olefins, cyclic olefins and diolefins, vinylaromatic olefins, α-olefinic diolefins, substituted α-olefins, and/or acetylenically unsaturated monomers. Non-limiting examples of α-olefins include propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 4-methyl-1-pentene, 3-methyl-1-pentene, 5-methyl-1-nonene, 3,5,5-trimethyl-1-hexene, vinylcyclohexane, and vinylnorbornane. A higher α-olefin is defined to be an α-olefin having 4 or more carbon atoms.

Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

Non-limiting examples of vinylaromatic olefins include styrene, para-methylstyrene, para-t-butylstyrene, vinylnaphthylene, vinyltoluene, and divinylbenzene.

Non-limiting examples of α-olefinic dienes include 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, 1,11-dodecene, 1,13-tetradecene and 9-methyl-1,9-decadiene.

In a preferred embodiment, the monomer consists essentially of propylene and is even more preferably 100% propylene. In an alternate embodiment the monomer composition comprises propylene and one or more further comonomers selected from the group consisting of: ethylene, and $C_4$ to $C_{20}$ hydrocarbyls, preferably ethylene, butene, hexene and octene.

Polymerization Process

The present polymerization process is conducted under homogeneous (such as solution, supersolution, or supercritical) conditions preferably including a temperature of about 60° C. to about 200° C., preferably for 65° C. to 195° C., preferably for 90° C. to 190° C., preferably from greater than 100° C. to about 180° C., such as 105° C. to 170° C., preferably from about 110° C. to about 160° C. The process may conducted at a pressure in excess of 1.7 MPa, especially under supersolution conditions including a pressure of between 1.7 MPa and 30 MPa, or especially under supercritical conditions including a pressure of between 15 MPa and 1500 MPa, especially when the monomer composition comprises propylene or a mixture of propylene with at least one $C_4$ to $C_{20}$ α-olefin. In a preferred embodiment the monomer is propylene and the propylene is present at 15 wt % or more in the polymerization system, preferably at 20 wt % or more, preferably at 30 wt % or more, preferably at 40 wt % or more, preferably at 50 wt % or more, preferably at 60 wt % or more, preferably at 70 wt % or more, preferably 80 wt % or more. In an alternate embodiment, the monomer and any comonomer present are present at 15 wt % or more in the polymerization system, preferably at 20 wt % or more, preferably at 30 wt % or more, preferably at 40 wt % or more, preferably at 50 wt % or more, preferably at 60 wt % or more, preferably at 70 wt % or more, preferably 80 wt % or more.

In a particular embodiment of the invention, the polymerization process is conducted under supersolution conditions including temperatures from about 65° C. to about 150° C., preferably from about 75° C. to about 140° C., preferably from about 90° C. to about 140° C., more preferably from about 100° C. to about 140° C., and pressures of between 1.72 MPa and 35 MPa, preferably between 5 and 30 MPa.

In another particular embodiment of the invention, the polymerization process is conducted under supercritical conditions (preferably homogeneous supercritical conditions, e.g. above the supercritical point and above the cloud point) including temperatures from about 90° C. to about 200° C., and pressures of between 15 MPa and 1500 MPa, preferably between 20 MPa and 140 MPa.

Chain transfer agents (such as hydrogen) may be used in the practice of this invention.

Solvents may be used in the homogeneous polymerizations described herein. Suitable solvents are generally aliphatic and aromatic hydrocarbons, with alkanes, such as pentane, isopentane, hexane, and octane, being preferred. Solution polymerization can be carried out in a continuous stirred tank reactor, batch reactor, or plug flow reactor, or more than one reactor operated in series or parallel. These reactors may have or may not have internal cooling and the monomer feed may or may not be refrigerated. See the general disclosure of U.S. Pat. No. 5,001,205 for general process conditions. See also WO 96/33227 and WO 97/22639. Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 90° C. and about 160° C., such as from greater than 100° C. to about 150° C., for example from about 105° C. to about 140° C. In series operation, the second reactor temperature is preferably higher than the first reactor temperature. In parallel reactor operation, the temperatures of the two reactors are independent. The pressure can vary from about 1 mm Hg to 2500 bar (250 MPa), preferably from 0.1 bar to 1600 bar (0.01-160 MPa), most preferably from 1.0 to 500 bar (0.1-50 MPa).

A supercritical state exists for a substance when the substance's temperature and pressure are above its critical point. The critical pressure and critical temperature of a fluid may be altered by changing the composition of the polymerization medium through combining it with another fluid, such as a diluent or another monomer. Thus, a supercritical polymerization medium is in the state where the polymerization medium is present at a temperature and pressure above the critical temperature and critical pressure of the medium, respectively. Supercritical polymerizations described herein can be performed at a temperature at or above the supercritical temperature of the polymerization system, or at a pressure at or above the supercritical pressure of the polymerization system, or at a temperature at or above the supercritical temperature and a pressure at or above the supercritical pressure of the polymerization system.

In some embodiments, one or more optional comonomers, diluents, or other fluids are present in the polymerization medium along with the monomer. Diluents, comonomers, and other fluids each modify the media's critical point; and hence, alter the pressure-temperature regime within which a particular medium is in a supercritical state. Diluents, comonomers and other fluids each also modify the phase behavior (and as such the cloud point) of the polymerization medium; and hence, alter the pressure-temperature regime within which a particular medium is single-phased. Useful diluents include one or more of $C_2$-$C_{24}$ alkanes, such as ethane, propane, n-butane, i-butane, n-pentane, i-pentane, n-hexane, mixed hexane isomers, mixed octane isomers, cyclopentane, cyclohexane, etc., single-ring aromatics, such as toluene and xylenes, and mixtures thereof. Additional useful diluents also include $C_4$ to $C_{150}$ isoparaffins, such as $C_4$ to $C_{100}$ isoparaffins, for example $C_4$ to $C_{25}$ isoparaffins. In another embodiment, the diluent comprises a fluorinated hydrocarbon.

Suitable reactors for supercritical polymerization include autoclave, loop, pump-around loop, pump-around autoclave, tubular, and autoclave/tubular reactors. Particularly useful are tubular reactors and autoclaves (also called stirred tank reactors). Autoclave reactors can be operated in batch or in continuous mode. To provide better productivity, and thus to lower production cost, continuous operation is preferred in commercial operations. Tubular reactors preferably operate in continuous mode. Typically, autoclave reactors have length-to-diameter ratios of 1:1 to 20:1 (preferably 4:1 to 20:1) and are typically fitted with a high-speed (up to 2000 RPM) multiblade stirrer. When the autoclave has a low length-to-diameter ratio (such as less than four) the feed streams are typically injected at only one position along the length of the reactor. Reactors with large diameters may have multiple injection ports at nearly the same position along the length of the reactor but radially distributed to allow for faster intermixing of the feed components with the reactor content.

In the case of stirred tank reactors, the separate introduction of the catalyst is possible and often preferred. Such introduction prevents the possible formation of hot spots in the catalyst or monomer rich zones. Injections at two or more positions along the length of the reactor is also possible and sometimes preferred. For instance, in reactors where the length-to-diameter ratio is around 4:1 to 20:1, the reactor preferably can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of mixing, largely independently, in the separate zones. Two or more autoclaves with one or more zones can connect in series cascade to increase residence time or to tailor polymer structure. As mentioned above, a series reactor cascade typically has two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are referred to as reactor trains. These reactor trains in turn may themselves comprise one reactor or a reactor series cascade creating a combination of series and parallel reactors.

Tubular reactors may also be used in the process disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternately, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm (alternately less than 10 cm). Typically, tubular reactors have length-to-diameter ratios of 10:1 to 50,000:1 and may include up to 10 different injection positions along its length.

Reactor trains that pair autoclaves with tubular reactors can also be used. In such instances, the autoclave typically precedes the tubular reactor or the two types of reactors form separate trains of a parallel reactor configuration. Such systems may have injection of additional catalyst and/or feed components at several points in the autoclave and more particularly along the tube length.

In both autoclaves and tubular reactors, at injection, feeds are preferably cooled to near ambient temperature or below to provide maximum cooling and thus maximum polymer production within the limits of maximum operating temperature. In autoclave operation, a preheater operates at startup, but not necessarily after the reaction reaches steady state if the first mixing zone has some back-mixing characteristics. In tubular reactors, the first section of double-jacketed tubing is heated rather than cooled and is operated continuously. A useful tubular reactor is characterized by plug flow. By plug flow, is meant a flow pattern with minimal radial flow rate differences. In both multizone autoclaves and tubular reactors, catalyst can be injected not only at the inlet, but also optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, a downstream separation vessel may contain a polymer-rich phase and a polymer-lean phase. Typically, conditions in this vessel remain supercritical and temperature remains above the polymer product's crystallization temperature. The autoclave or tubular reactor effluent is depressurized on entering the high pressure separator (HPS).

One or more reactors in series or in parallel may be used in the present process. The catalyst precursor, activator and when required, co-activator, may be delivered as a solution, either separately to the reactor, activated in-line just prior to the reactor, or preactivated and pumped as an activated solution to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst components may also be added to both reactors, with one component being added to first reaction and another component to other reactors.

The present catalyst compositions can be used individually or can be mixed with other known polymerization catalysts to prepare polymer blends. Monomer and catalyst selection allows polymer blend preparation under conditions analogous to those using individual catalysts. Polymers having increased MWD for improved processing and other traditional benefits available from polymers made with mixed catalyst systems can thus be achieved.

A particular embodiment of this invention relates to a process to polymerize propylene comprising contacting, at a temperature of 60° C. or more and a pressure of between 15 MPa (150 Bar, or about 2175 psi) to 1500 MPa (15,000 Bar, or about 217,557 psi), one or more olefin monomers having three or more carbon atoms, with: 1) the catalyst system, 2) optionally one or more comonomers, 3) optionally diluent or solvent, and 4) optionally scavenger, wherein: a) the olefin monomers and any comonomers are present in the polymerization system at 40 wt % or more, b) the propylene is present at 80 wt % or more based upon the weight of all monomers and comonomers present in the feed, c) the polymerization occurs at a temperature above the solid-fluid phase transition temperature of the polymerization system and a pressure no lower than 2 MPa below the cloud point pressure of the polymerization system.

Another particular embodiment of this invention relates to a process to polymerize olefins comprising contacting propylene, at a temperature of 65° C. to 150° C. and a pressure of between 250 to 5,000 psi (1.72 to 34.5 MPa), with: 1) the catalyst system, 2) 0 to 20 wt % of one or more comonomers (based upon the weight of all monomers and comonomers present in the feed) selected from the group consisting of ethylene and $C_4$ to $C_{12}$ olefins, 3) from 20 to 65 wt % diluent or solvent, based upon the total weight of feeds to the polymerization reactor, and 4) 0 to 5 wt % scavenger, based upon the total weight of feeds to the polymerization reactor, wherein: a) the olefin monomers and any comonomers are present in the polymerization system at 15 wt % or more, b) the propylene is present at 80 wt % or more based upon the weight of all monomers and comonomers present in the feed, c) the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system.

In another embodiment, the polymerization occurs at a temperature above the solid-fluid phase transition temperature of the polymerization system and a pressure no lower than 10 MPa below the cloud point pressure (CPP) of the polymerization system (preferably no lower than 8 MPa below the CPP, preferably no lower than 6 MPa below the CPP, preferably no lower than 4 MPa below the CPP, preferably no lower than 2 MPa below the CPP). Preferably, the polymerization occurs at a temperature and pressure above the solid-fluid phase transition temperature and pressure of the polymerization system and, preferably above the fluid-fluid phase transition temperature and pressure of the polymerization system.

In an alternate embodiment, the polymerization occurs at a temperature above the solid-fluid phase transition temperature of the polymerization system and a pressure greater than 1 MPa below the cloud point pressure (CPP) of the polymerization system (preferably greater than 0.5 MPa below the CPP, preferably greater than the CCP), and the polymerization occurs: (1) at a temperature below the critical temperature of the polymerization system, or (2) at a pressure below the critical pressure of the polymerization system, preferably the polymerization occurs at a pressure and temperature below the critical point of the polymerization system, most preferably the polymerization occurs: (1) at a temperature below the critical temperature of the polymerization system, and (2) at a pressure below the critical pressure of the polymerization system.

Alternately, the polymerization occurs at a temperature and pressure above the solid-fluid phase transition temperature and pressure of the polymerization system. Alternately, the polymerization occurs at a temperature and pressure above the fluid-fluid phase transition temperature and pressure of the polymerization system. Alternately, the polymerization occurs at a temperature and pressure below the fluid-fluid phase transition temperature and pressure of the polymerization system.

In another embodiment, the polymerization system is preferably a homogeneous, single phase polymerization system, preferably a homogeneous dense fluid polymerization system.

In another embodiment, the reaction temperature is preferably below the critical temperature of the polymerization system. Preferably, the temperature is above the solid-fluid phase transition temperature of the polymer-containing fluid reaction medium at the reactor pressure or at least 5° C. above the solid-fluid phase transition temperature of the polymer-containing fluid reaction medium at the reactor pressure, or at least 10° C. above the solid-fluid phase transformation point of the polymer-containing fluid reaction medium at the reactor pressure. In another embodiment, the temperature is above the cloud point of the single-phase fluid reaction medium at the reactor pressure, or 2° C. or more above the cloud point of the fluid reaction medium at the reactor pressure. In yet another embodiment, the temperature is between 60° C. and 150° C., between 60° C. and 140° C., between 70° C. and 130° C., or between 80° C. and 130° C. In one embodiment, the temperature is above 60° C., 65° C., 70° C., 75° C., 80° C., 85° C., 90° C., 95° C., 100° C., 105° C., or 110° C. In another embodiment, the temperature is below 150° C., 140° C., 130° C., or 120° C. In another embodiment, the cloud point temperature is below the supercritical temperature of the polymerization system or between 70° C. and 150° C.

In another embodiment, the polymerization occurs at a temperature and pressure above the solid-fluid phase transition temperature of the polymerization system, preferably the polymerization occurs at a temperature at least 5° C. higher (preferably at least 10° C. higher, preferably at least 20° C. higher) than the solid-fluid phase transition temperature and at a pressure at least 2 MPa higher (preferably at least 5 MPa higher, preferably at least 10 MPa higher) than the cloud point pressure of the polymerization system. In a preferred embodiment, the polymerization occurs at a pressure above the fluid-fluid phase transition pressure of the polymerization system (preferably at least 2 MPa higher, preferably at least 5 MPa higher, preferably at least 10 MPa higher than the fluid-fluid phase transition pressure). Alternately, the polymerization occurs at a temperature at least 5° C. higher (preferably at least 10° C. higher, preferably at least 20° C. higher) than the solid-fluid phase transition temperature and at a pressure higher than, (preferably at least 2 MPa higher, preferably at least 5 MPa higher, preferably at least 10 MPa higher) than the fluid-fluid phase transition pressure of the polymerization system.

In another embodiment, the polymerization occurs at a temperature above the solid-fluid phase transition temperature of the polymer-containing fluid reaction medium at the reactor pressure, preferably at least 5° C. above the solid-fluid phase transition temperature of the polymer-containing fluid reaction medium at the reactor pressure, or preferably at least 10° C. above the solid-fluid phase transformation point of the polymer-containing fluid reaction medium at the reactor pressure.

In another useful embodiment, the polymerization occurs at a temperature above the cloud point of the single-phase fluid reaction medium at the reactor pressure, more preferably 2° C. or more (preferably 5° C. or more, preferably 10° C. or more, preferably 30° C. or more) above the cloud point of the fluid reaction medium at the reactor pressure. Alternately, in another useful embodiment, the polymerization occurs at a temperature above the cloud point of the polymerization system at the reactor pressure, more preferably 2° C. or more (preferably 5° C. or more, preferably 10° C. or more, preferably 30° C. or more) above the cloud point of the polymerization system.

In another embodiment, the polymerization process temperature is above the solid-fluid phase transition temperature of the polymer-containing fluid polymerization system at the reactor pressure, or at least 2° C. above the solid-fluid phase transition temperature of the polymer-containing fluid polymerization system at the reactor pressure, or at least 5° C. above the solid-fluid phase transition temperature of the polymer-containing fluid polymerization at the reactor pressure, or at least 10° C. above the solid-fluid phase transformation point of the polymer-containing fluid polymerization system at the reactor pressure. In another embodiment, the polymerization process temperature should be above the cloud point of the single-phase fluid polymerization system at the reactor pressure, or 2° C. or more above the cloud point of the fluid polymerization system at the reactor pressure. In still another embodiment, the polymerization process temperature is between 50° C. and 350° C., or between 60° C. and 250° C., or between 70° C. and 250° C., or between 80° C. and 250° C. Exemplary lower polymerization temperature limits are 50° C., or 60° C., or 70° C., or 80° C., or 90° C., or 95° C., or 100° C., or 110° C., or 120° C. Exemplary upper polymerization temperature limits are 350° C., or 250° C., or 240° C., or 230° C., or 220° C., or 210° C., or 200° C.

Polymer Products

While the MW of polypropylene based polymers is influenced by reactor conditions including temperature, propylene concentration and pressure, the presence of chain terminating agents and the like, the polypropylene homopolymer and copolymer products produced by the present process typically have an Mw of about 20,000 to about 1,000,000 g/mol, alternately of about 40,000 to about 600,000 g/mol, or alternately of about 100,000 to about 500,000 g/mol (where all molecular weight values (Mn, Mw and Mz) are presented in terms of calculated polypropylene molecular weights). Likewise, while reactor conditions can influence polymer melting point, the polypropylene homopolymer and copolymer products produced by the present process typically have a $T_m$ of about 100° C. to about 175° C., alternately of about 120° C. to about 170° C., alternately of about 140° C. to about 165° C. Alternately the polymers produced have a $T_m$ of 150° C. or more. In addition, the polymer products typically have a heat of fusion, ($H_f$ or $\Delta H_f$), of up to 160 J/g, alternately from 20 up to 150 J/g, alternately from about 80 to 110 J/g, alternately from about 90 to 110 J/g, alternately greater than 90 J/g.

In a preferred embodiment the polymer produced herein has a $T_m$ of 155° C. or more (preferably 160° C. or more, or 165° C. or more), and an Mn of 120,000 g/mol or more, preferably 200,000 g/mol or more, more preferably 300,000 g/mol or more (GPC-DRI, relative to linear polystyrene standards). GPC-DRI, relative to linear polystyrene standards means that the numerical values have not been corrected to polypropylene values.

In another embodiment, the polymer produced herein has a $T_m$ of 145° C. or more (preferably 150° C. or more, 155° C. or more, 160° C. or more, 165° C. or more), and an Mw of 150,000 or more g/mol, preferably 200,000 g/mol or more, more preferably 300,000 g/mol or more (GPC-DRI, corrected to polypropylene values). GPC-DRI, corrected to polypropylene values means that while the GPC instrument was calibrated to linear polystyrene samples, values reported are corrected to polypropylene values using the appropriate Mark Houwink coefficients.

In another embodiment, the polymer produced herein has a $T_m$ of 140° C. or more (preferably 145° C. or more, 150° C. or more, 155° C. or more, 160° C. or more, 165° C. or more), and an Mn of 300,000 g/mol or more, preferably 400,000 g/mol or more, more preferably 500,000 g/mol or more (GPC-DRI, corrected to polypropylene values).

The polymer products produced by the present process may be blended with one or more other polymers, including but not limited to, thermoplastic polymer(s) and/or elastomer(s), such as those disclosed at page 59 of WO 2004/014998.

The polymers of this invention (and blends thereof as described above) whether formed in situ or by physical blending are preferably used in any known thermoplastic or elastomer application. Examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, sealants, surgical gowns and medical devices. Films of polymers produced herein may made according to WO 2004/014998 at page 63, line 1 to page 66, line 26, including that the films of polymers produced herein may be combined with one or more other layers as described at WO 2004/014998 at page 63, line 21 to page 65, line 2.

In another embodiment, this invention relates to:

1. A process for producing a propylene-based olefin homopolymer or copolymer, the process comprising:

A) contacting a monomer composition comprising propylene with a polymerization catalyst system under homogeneous polymerization conditions and at a temperature of about 100° C. to about 195° C., wherein the polymerization catalyst system includes an activator and a catalyst compound of the formula (I) shown in the Summary of the Invention above;

B) obtaining a polymer having a melting point of 155° C. or more, and an Mn of 120,000 g/mol or more (GPC-DRI, relative to linear polystyrene standards).

2. The process of paragraph 1 wherein said temperature is from greater than 100° C. to about 180° C.

3. A process for producing a propylene-based olefin homopolymer or copolymer, the process comprising:

A) contacting a monomer composition comprising propylene with a polymerization catalyst system under homogeneous polymerization conditions of: 1) a temperature of about 65° C. to about 150° C., 2) a pressure of 1.72 to 35 MPa, 3) from 20 to 65 wt % diluent or solvent, based upon the total weight of feeds to the polymerization reactor, and 4) 0 to 5 wt % scavenger, based upon the total weight of feeds to the polymerization reactor, wherein: a) the olefin monomers and any comonomers are present in the polymerization system at 15 wt % or more, b) the propylene is present at 80 wt % or more based upon the weight of all monomers and comonomers present in the feed, c) the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system, wherein the polymerization catalyst system includes an activator and the catalyst compound described in paragraph 1, B) obtaining a polymer having a melting point of 145° C. or more, and an Mn of 150,000 g/mol or more (GPC-DRI, corrected to polypropylene values).

4. The process of paragraph 3 wherein said contacting is conducted at a pressure in excess of 5 MPa.

5. The process of paragraph 3 or 4 wherein said temperature is from greater than 100° C. to about 150° C.

6. A process for producing a propylene-based olefin homopolymer or copolymer, the process comprising:

A) contacting a monomer composition comprising propylene with a polymerization catalyst system under homogeneous polymerization conditions of 1) a temperature of 60° C. or more, 2) a pressure of 15 to 1000 MPa, 3) the olefin monomers and any comonomers are present in the polymerization system at 40 wt % or more, 4) the propylene is present at 80 wt % or more based upon the weight of all monomers and comonomers present in the feed, 5) the polymerization occurs at a temperature above the solid-fluid phase transition temperature of the polymerization system and a pressure no lower than 2 MPa below the cloud point pressure of the polymerization system;

wherein the polymerization catalyst system includes an activator and the catalyst compound described in paragraph 1;

B) obtaining a polymer having a melting point of 140° C. or more, and an Mn of 300,000 g/mol or more (GPC-DRI, corrected to polypropylene values).

7. The process of paragraph 6 wherein said temperature is from greater than 100° C. to about 250° C.

8. The process of any of paragraphs 1-7 wherein each $R^1$ is hydrogen and each of $R^2$, $R^3$, $R^5$, $R^6$ and $R^7$ is, independently, hydrogen, or a hydrocarbyl group having 1 to 10 carbon atoms.

9. The process of any of paragraphs 1-8 wherein $R^2$ is methyl.

10. The process of any of paragraphs 1-9 wherein each $R^1$, $R^3$, $R^5$, $R^6$, and $R^7$ are hydrogen.

11. The process of any of paragraphs 1-10 wherein said monomer consists essentially of propylene.

12. The process of any of paragraphs 1-11 wherein the monomer composition comprises a further comonomer selected from the group consisting of: ethylene, and $C_4$ to $C_{12}$ α-olefins, cyclic olefins or α-olefinic diolefins.

13. The process of any of paragraphs 1-12 wherein the monomer is 100% propylene.

14. The process of any of paragraphs 1-13 wherein the catalyst compound is selected from the group consisting of dimethylsilylene bis(2-methyl-4-carbazolylindenyl) zirconium dimethyl and dimethylsilylene bis(2-methyl-4-carbazolylindenyl) zirconium dichloride.

15. The process of any of paragraphs 1-14 wherein the activator comprises a non-coordinating anion.

The invention will now be more particularly described with reference to the following non-limiting Examples.

Experimental

Synthesis of Pre-Catalysts

All manipulations with air and moisture sensitive compounds were performed either in an atmosphere of thoroughly purified argon using a standard Schlenk technique or in a controlled atmosphere Glove Box (Vacuum Atmospheres Co.). Tetrahydrofuran (THF, Merck=Merck KGaA, Darmstadt, Germany) and diethyl ether (Merck) for synthesis were purified by distillation over LiAlH$_4$, and stored over sodium benzophenone ketyl under an inert atmosphere; prior to use, the solvents were distilled from the benzophenone ketyl. Hydrocarbon solvents such as benzene (Merck), toluene (Merck) and hexanes (Merck) were typically distilled over CaH$_2$, and were stored over Na/K alloy under an inert atmosphere; prior to use, the solvents were distilled from the Na/K alloy. Methylene chloride (Merck, and CCl$_2$D$_2$ for NMR measurements, Cambridge Isotope Laboratories, Inc.) was distilled and stored over CaH$_2$ under an inert atmosphere; prior to use, the solvent was distilled from the CaH$_2$. Chloroform-d (Merck) was distilled over P$_4$O$_{10}$ and stored over molecular sieves (3 Å). Anhydrous ZrCl$_4$ (Aldrich=Aldrich Chemical Co., or Merck), ZrCl$_4$(THF)$_2$ (Aldrich), 2.5M $^n$BuLi in hexanes (Chemetall=Chemetall Chemical Products, or Acros), $^t$BuOLi (Aldrich), tri(tert-butyl)phosphine=P$^t$Bu$_3$ (Strem), 2-[di(tert-butyl)phosphino]-1,1'-biphenyl (Strem), Pd(dba)$_2$ (Aldrich, dba=dibenzylidenacetone), Pd(OAc)$_2$ (Strem=Strem Chemical Co., OAc=acetate), Et$_3$SnCl (Alfa Aesar), anhydrous K$_2$CO$_3$ (Merck), Na$_2$SO$_4$ (Akzo Nobel), CuCN (Merck), dimethyldichlosilane (Merck), pyrrole (Merck), indole (Acros), carbazole (Aldrich), anhydrous ethanol (Merck), methanol (Merck), methyl-tert-butyl ether (Acros=Acros Organics), and MeMgCl in ether (Aldrich) were used as obtained. A mixture of 4- and 7-bromo-2-methyl-1H-indene (1) was prepared as described in U.S. Pat. No. 7,276,567. Comparative transition metal compounds, rac-dimethylsilylene-bis(2-methyl-4-phenylindenyl)zirconium dichloride (rac-C) and rac-dimethylsilylene-bis(2-methyl-4-phenylindenyl)zirconium dimethyl (rac-D) can be commercially purchased or prepared as described in U.S. Pat. No. 5,770,753 and related patents. rac-Dimethylsilylene-bis[(2-methyl-4-(3',5'-di$^t$butyl)phenyl)indenyl]zirconiumdimethyl (rac-E) can be prepared as described in WO2002/02576 and related patents. Activator F=[N,N-dimethylanilinium][tetrakis(pentafluorophenyl)borate] can be purchased from Boulder Chemical Company, and Activator G=[N,N-dimethylanilinium][tetrakis(heptafluoronaphthyl)borate] can be prepared as described in EP 1 060 198 B1.

Silica Gel 60, 40-63 μm (Merck and Fluka) was used as obtained. Celite 503 (Fluka Chemical Corp.) was dried in vacuum at 180° C.

Analytical and semi-preparative liquid chromatography was performed using Waters Delta 600 HPLC system including 996 Photodiode Array Detector, Nova-Pack C18 or HR Silica (60 A, 6 μm, 3.9 and 19×300 mm) and Symmetry C18 (5 μm, 4.6×250 mm) columns. $^1$H, and $^{13}$C spectra were recorded with a Brucker DPX-300 for 1-10% solutions in deuterated solvents. Chemical shifts for $^1$H and $^{13}$C were measured relatively to tetramethylsilane (TMS). C, H microanalyses were done using CHN—O-Rapid analyzer (Heraecus Ltd., Banau, Germany).

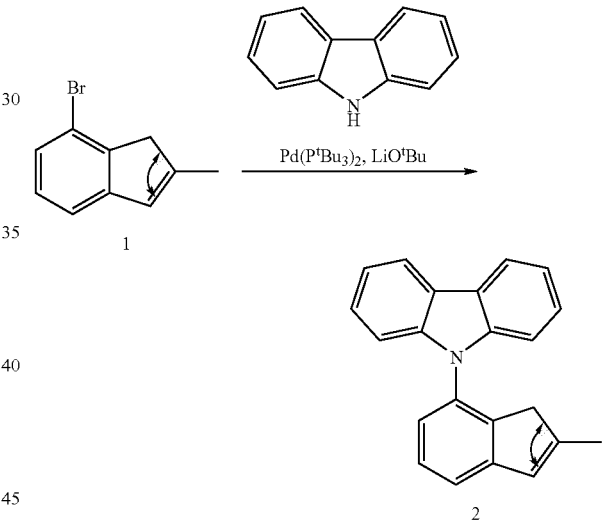

Preparation of a mixture of 9-(2-methyl-1H-inden-4-yl)-9H-carbazole and 9-(2-methyl-1H-inden-7-yl)-9H-carbazole (2)

To a mixture of 10.5 g (50 mmol) of 1, 8.69 g (52 mmol) of 9H-carbazole, 12.0 g (150 mmol) of $^t$BuOLi 575 mg (2.0 mmol) of Pd(dba)$_2$ and 404 mg (2.0 mmol) of tri(tertbutyl) phosphine in 150 ml of toluene was added. The resulting mixture was refluxed for 12 hours, cooled to ambient temperature, and then added to 100 ml of cold water. The organic layer was separated, and the aqueous layer was washed by 2×150 ml of dichloromethane. The combined extract was dried over Na$_2$SO$_4$ and evaporated to dryness. The crude product was purified by flash-chromatography on Silica Gel 60 (40-63 μm, d 50 mm, 1300 mm; eluent: hexanes). Yield 8.12 g (55%) of yellow oil of a ca. 1 to 1 mixture of 9-(2-methyl-1H-inden-4-yl)-9H-carbazole (2a) and 9-(2-methyl-1H-inden-7-yl)-9H-carbazole (2b). Anal. calc. for $C_{22}H_{17}N$: C, 89.46; H, 5.80. Found: C, 89.60; H, 5.87. $^1$H NMR (CDCl$_3$): δ 8.14 (m, 4H, 4,5-H in carbazole of 2a and 2b), 7.10-7.46 (m, 18H, 5,6,7-H in indenyl and 1,2,3,6,7,8-H in carbazole of 2a and 4,5,6-H in indenyl and 1,2,3,6,7,8-H in carbazole of 2b), 6.54 (m, 1H, 3-H in indenyl of 2a), 6.01 (m, 1H, 3-H in indenyl of 2b), 3.40 (s, 2H, CH$_2$ of 2b), 2.97 (s, 2H, CH$_2$ of 2a), 2.01 (m, 3H, 2-Me of 2b), 2.00 (m, 3H, 2-Me of 2a). $^{13}$C{$^1$H} NMR (CDCl$_3$): δ 148.3, 147.28, 147.23, 146.9, 145.5, 143.6, 141.25, 141.21, 140.88, 140.85, 140.7, 132.5, 128.1, 127.0, 125.7, 125.6, 124.9, 124.7, 123.5, 122.9, 120.3, 120.2, 119.8, 119.5, 110.2, 110.0, 43.2, 41.3, 16.7, 16.5.

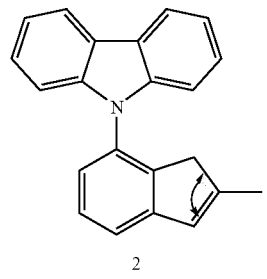

H, 5.92. Found: C, 85.61; H, 6.06. $^1$H NMR (CDCl$_3$): δ 8.19 (m, 8H, 4,4',5,5'-H in carbazole of rac- and meso-compounds), 7.69 (m, 2H, 5,5'-H in indenyl of rac-compound), 7.56 (m, 2H, 5,5'-H in indenyl of meso-compound), 7.25-7.44 (m, 28H, 6,6',7,7'-H in indenyl and 1,1',2,2',3,3',6,6',7,7',8,8'-H in carbazole of rac- and meso-compounds), 7.12-7.17 (m, 4H, 7,7'-H of rac- and meso-compounds), 6.19 (br.s, 4H, 3,3'-H in indenyl of rac- and meso-compounds), 3.99 (br.s, 2H, 1,1'-H in indenyl of rac-compound), 3.95 (br.s, 2H, 1,1'-H in indenyl of meso-compound), 2.22 (d, J=1.1 Hz, 6H, 2,2'-Me in meso-compound), 2.16 (d, J=1.1 Hz, 6H, 2,2'-Me in rac-compound), −0.098 (s, 3H, SiMe of meso-compound), −0.101 (s, 3H, SiMe' of meso-compound), −0.13 (s, 6H, SiMe$_2$ of rac-compound).

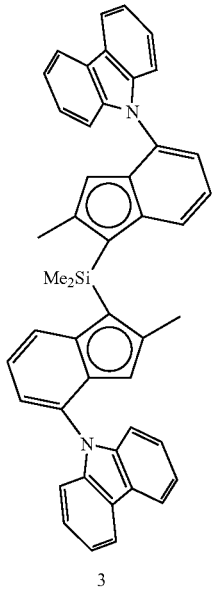

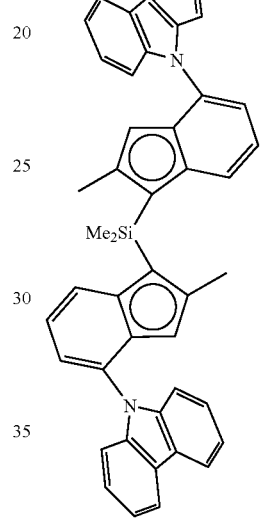

Preparation of a Mixture of rac- and meso-bis[2-methyl-4-(9H-carbazol-9-yl)-1H-inden-1-yl](dimethyl)silanes (3)

To a solution of 7.25 g (24.6 mmol) of 2 in 250 ml of ether 9.85 ml of 2.5 M $^n$BuLi (24.6 mmol) in hexanes was added dropwise at vigorous stirring at room temperature. This mixture was stirred for 3 h at room temperature and then cooled to −80° C. At this temperature, 1.10 g (12.5 mmol) of CuCN was added. Next, the resulting mixture was stirred for 1 h at 0° C., and then cooled to −80° C. To this mixture 1.50 ml (1.62 g, 12.5 mmol) of Me$_2$SiCl$_2$ was added. The resulting mixture was stirred overnight at ambient temperature, and then 2 ml of water was added. The resulting mixture was filtered through glass frit (G4), and the precipitate was additionally washed by 2×20 ml of ether. The combined ether filtrate was dried over Na$_2$SO$_4$ and evaporated to dryness. The crude product was washed by 3×20 ml of methanol and dried in vacuum. Yield 7.56 g (95%) of white solid of ca. 1 to 1 mixture of rac- and meso-compounds (3). Anal. calc. for C$_{46}$H$_{38}$N$_2$Si: C, 85.41;

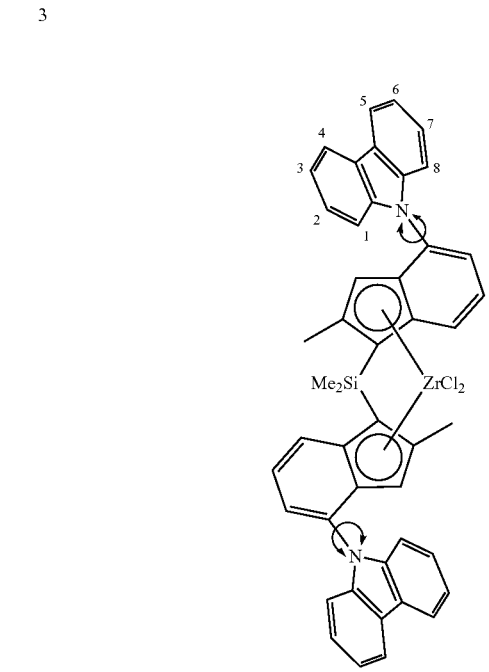

Preparation of Transition Metal Complexes rac-4 (Shown Above) and meso-4 (Not Shown Above)

To a solution of 6.47 g (10.0 mmol) of 3 in 200 ml of ether 8.13 ml (20.3 mmol) of 2.5 M "BuLi in hexanes was added at ambient temperature. This mixture was stirred overnight, and then 3.77 g (10.0 mmol) of $ZrCl_4(THF)_2$ was added. The resulting mixture was stirred for 24 h at room temperature and then evaporated to dryness. Further on, 100 ml of toluene was added. The resulting mixture was stirred for 10 h at 60° C., then cooled to ambient temperature and filtered through glass frit (G4). The filtrate was evaporated to dryness to give orange oil. To this oil 20 ml of toluene was added. The precipitate formed was separated, washed by 5 ml of toluene, and dried in vacuum. This procedure gave 1.53 g (19%) of pure meso-4 as orange powder. Anal. calc. for $C_{46}H_{36}Cl_2N_2SiZr$: C, 68.46; H, 4.50. Found: C, 68.59; H, 4.66. $^1H$ NMR ($CD_2Cl_2$): δ 8.11 (m, 4H, 3,3',6,6'-H in carbazolyl), 7.95-8.03 (m, 4H, 2,2',7,7'-H in carbazolyl), 7.51 (d, J=7.2 Hz, 2H, 5,5'-H in indenyl), 7.36 (m, 2H, 1,1'-H in carbazolyl), 7.28 (m, 2H, 8,8'-H in carbazolyl), 7.24 (m, 4H, 4,4',5,5'-H in carbazolyl), 7.12 (dd, J=8.6 Hz, J=7.2 Hz, 2H, 6,6'-H in indenyl), 6.83 (m, 2H, 7,7'-H in indenyl), 6.48 (s, 2H, 3,3'-H in indenyl), 2.41 (s, 6H, 2,2'-Me), 1.58 (s, 3H, SiMeMe'), 1.30 (s, 3H, SiMeMe'). The precipitate on the glass frit above was washed by 2×20 ml of toluene, and, next, 2×25 ml of dichloromethane. The dichloromethane filtrate was evaporated to dryness giving 1.93 g (24%) of pure rac-4 as yellow powder. Anal. calc. for $C_{46}H_{36}Cl_2N_2SiZr$: C, 68.46; H, 4.50. Found: C, 68.67; H, 4.60. $^1H$ NMR ($CD_2Cl_2$): δ 8.07 (m, 4H, 3,3',6,6'-H in carbazolyl), 7.88 (m, 2H, 1,1'-H in carbazolyl), 7.80 (m, 2H, 8,8'-H in carbazolyl), 7.54 (d, J=7.1 Hz, 2H, 7,7'-H in indenyl), 7.12-7.28 (m, 10H, 5,5'-H in indenyl and 2,2',4,4',5,5',7,7'-H in carbazolyl), 6.78 (m, 2H, 6,6'-H in indenyl), 6.53 (s, 2H, 3,3'-H in indenyl), 2.30 (s, 6H, 2,2'-Me), 1.38 (s, 6H, SiMe_2). $^{13}C\{^1H\}$ NMR ($CD_2Cl_2$): δ 139.4, 139.1, 134.9, 132.7, 130.2, 126.9, 125.0, 124.5, 124.4, 124.0, 123.9, 119.4, 118.7, 118.44, 118.38, 110.9, 109.2, 17.3, 0.8.

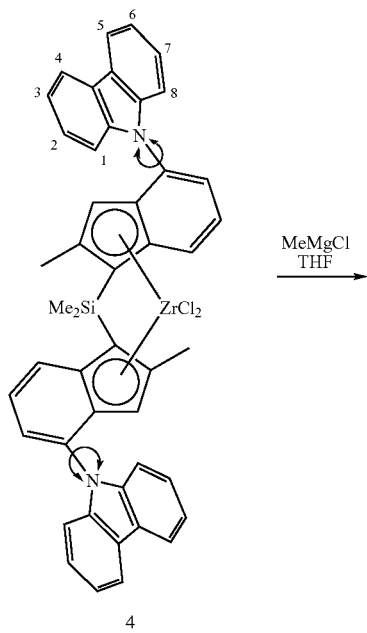

4

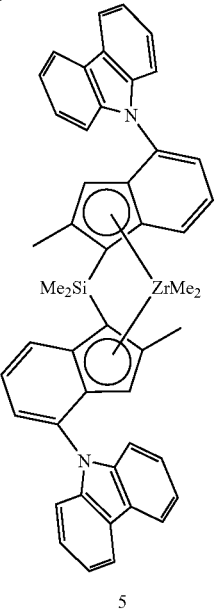

5

Preparation of Transition Metal Complex rac-5

To a suspension of 404 mg (0.5 mmol) of meso-4 in 20 ml of THF, 0.5 ml of 2.4 M MeMgCl (1.20 mmol) in ether was added at room temperature. This mixture was stirred for 4 h and then evaporated to dryness in vacuum. Note that meso-4 reacts with MeMgCl to form meso-5 which in the presence of $MgCl_2$, rearranges to form rac-5. The residue was washed by 3×10 ml of ether and dried in vacuum. Yield 161 mg (42%) of yellowish crystals of pure rac-5. Anal. calc. for $C_{48}H_{42}N_2SiZr$: C, 75.25; H, 5.53. Found: C, 75.43; H, 5.71. $^1H$ NMR ($C_6D_6$): δ 8.08 (m, 2H, 4,4'- or 5,5'-H in carbazole), 8.04 (m, 2H, 5,5'- or 4,4'-H in carbazole), 7.85 (m, 2H, 1,1'- or 8,8'-H in carbazole), 7.39 (m, 2H, 8,8'- or 1,1'-H in carbazole), 6.95-7.41 (m, 12H, 2,2',3,3',6,6',7,7'-H in carbazole and 5,5',7,7'-H in indenyl), 6.69 (dd, J=8.5 Hz, J=7.4 Hz, 2H, 6,6'-H in indenyl), 6.61 (s, 2H, 3,3'-H in indenyl), 1.79 (s, 6H, 2,2'-Me in indenyl), 0.79 (s, 6H, SiMe_2), −0.80 (s, 6H, $ZrMe_2$).

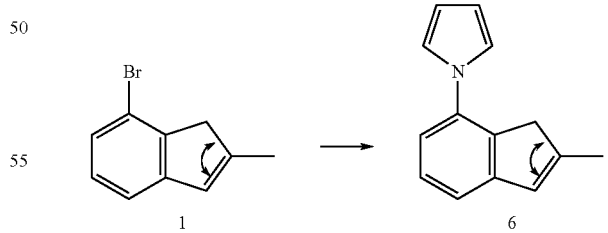

Preparation of a Mixture of 1-(2-methyl-1H-inden-4-yl)-1H-pyrrole and 1-(2-methyl-1H-inden-7-yl)-1H-pyrrole (6)

A solution of 15.2 g (227 mmol) of pyrrole in 300 ml of toluene was metallated with 80.0 ml of 2.5 M "BuLi (200 mmol) in hexanes by vigorous stirring at 0° C. The resulted mixture was warmed to room temperature and stirred for 15 min; then, hexanes was distilled off in vacuum. To the residue a solution of 37.6 g (180 mmol) of 1 in 150 ml of toluene was added; then, 898 mg (4.0 mmol) of Pd(OAc)$_2$ and 1.79 g (6.0 mmol) of 2-[di(tert-butyl)phosphino]-1,1'-biphenyl was added. This resulting mixture was refluxed for 1 hour and then cooled to ambient temperature. The solution was decanted, and the precipitate was additionally washed by 3×100 ml of methyl-tert-butyl ether. The combined extract was evaporated using rotary evaporator. The residue was dissolved in 100 ml of hexanes. This solution was passed through a short column with Silica Gel 60 (40-63 μm, d 60 mm, 1150 mm; eluent: hexanes/dichloromethane=2/1, vol). Vacuum distillation of the crude product gave yellowish oil, b.p. 145° C./5 mm Hg. Yield 29.2 g (83%) of a ca. 1 to 1 mixture of 1-(2-methyl-1H-inden-4-yl)-1H-pyrrole (6a) and 1-(2-methyl-1H-inden-7-yl)-1H-pyrrole (6b). Anal. calc. for $C_{14}H_{13}N$: C, 86.12; H, 6.71. Found: C, 86.25; H, 6.76. $^1$H NMR (CDCl$_3$): δ 7.23-7.29 (m, 2H, 5-H and 6-H in indenyl of 6a and 6b, respectively), 7.03-7.17 (m, 4H, 6,7-H and 5-H in indenyl of 6a and 6b, respectively), 7.04 (dd, J=7.9 Hz, J=1.0 Hz, 1H, 4-H in indenyl of 6b), 7.01 (t, J=2.2 Hz, 2,5-H in pyrrole of 6b), 6.96 (t, J=2.2 Hz, 2,5-H in pyrrole of 6a), 6.62 (m, 1H, 3-H in indenyl of 6a), 6.48 (m, 1H, 3-H in indenyl of 6b), 6.33 (t, J=2.2 Hz, 2H, 3,4-H in pyrrole of 6a), 6.32 (t, J=2.2 Hz, 2H, 3,4-H in pyrrole of 6b), 3.36 (m, 2H, CH$_2$ in indenyl of 6b), 3.33 (m, 2H, CH$_2$ in indenyl of 6a), 2.11 (m, 6H, 2-Me in indenyl of 6a and 6b). $^{13}$C{$^1$H} NMR (CDCl$_3$): δ 148.0, 147.1, 146.6, 145.2, 139.4, 136.8, 135.4, 133.2, 127.8, 127.0, 124.3, 121.7, 121.6, 121.3, 120.7, 118.9, 118.1, 109.15, 109.12, 43.0, 41.9, 16.7, 16.5.

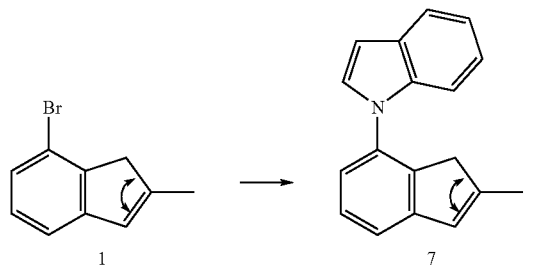

Preparation of a Mixture of 1-(2-methyl-1H-inden-4-yl)-1H-indole and 1-(2-methyl-1H-inden-7-yl)-1H-indole (7)

A solution of 6.44 g (55.0 mmol) of 1H-indole in 100 ml of toluene was metallated by 20.0 ml of 2.5 M $^n$BuLi (50 mmol) in hexanes by vigorous stirring at 0° C. The resulting mixture was warmed to room temperature and stirred for 15 min; then, hexanes was distilled off in vacuum. To the residue a solution of 9.41 g (45.0 mmol) of 1 in 60 ml of toluene was added; then, 225 mg (1.0 mmol) of Pd(OAc)$_2$ and 448 mg (1.5 mmol) of 2-[di(tert-butyl)phosphino]-1,1'-biphenyl were added. The resulting mixture was refluxed for 1 h and then cooled to ambient temperature. The solution was decanted, and the precipitate was additionally washed by 100 ml of methyl-tert-butyl ether. The combined extract was evaporated using rotary evaporator. The crude product was dissolved in 100 ml of hexanes. This solution was passed through short column with Silica Gel 60 (40-63 μm, d 60 mm, 1150 mm; eluent: hexanes/dichloromethane=2/1, vol). Vacuum distillation of the crude product gave yellowish oil, b.p. 122° C.-125° C./0.5 mm Hg. Yield 9.33 g (85%) of a ca. 1 to 1 mixture of 1-(2-methyl-1H-inden-4-yl)-1H-indole (7a) and 1-(2-methyl-1H-inden-7-yl)-1H-indole (7b). This oil crystallizes slowly at room temperature. Anal. calc. for $C_{18}H_{15}N$: C, 88.13; H, 6.16. Found: C, 88.18; H, 6.13. $^1$H NMR (CDCl$_3$): δ 7.68 (m, 2H, 5-H in indolyl of 7a and 7b), 7.10-7.37 (m, 16H, 5,6,7-H in indenyl and 2,4,6,7,8-H in indolyl of 7a and 4,5,6-H in indenyl and 2,4,6,7,8-H in indolyl of 7b), 6.66 (m, 2H, 3-H in indolyl of 7a and 7b), 6.51 (m, 1H, 3-H in indenyl of 7a), 6.28 (m, 1H, 3-H in indenyl of 7b), 2.07 (m, 3H, 2-Me in indenyl of 7a or 7b), 2.05 (m, 3H, 2-Me in indenyl of 7b or 7a). $^{13}$C{$^1$H} NMR (CDCl$_3$): δ 148.0, 147.2, 146.8, 145.2, 141.7, 138.9, 136.6, 136.2, 134.8, 131.0, 128.7, 128.63, 128.56, 128.0, 127.7, 127.0, 124.6, 124.4, 123.9, 122.3, 121.92, 121.89, 121.7, 121.0, 120.8, 119.94, 119.88, 119.1, 110.9, 110.7, 102.7, 43.1, 41.4, 16.8, 16.6.

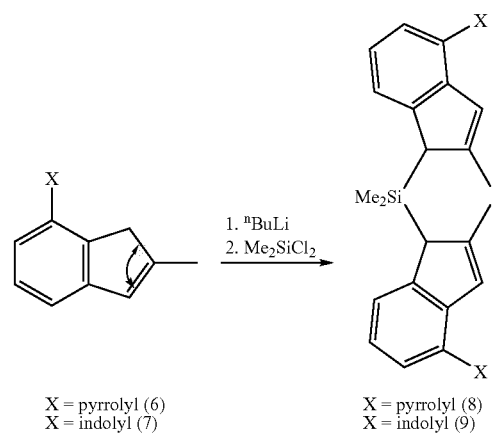

X = pyrrolyl (6)
X = indolyl (7)

X = pyrrolyl (8)
X = indolyl (9)

Preparation of a Mixture of rac- and meso-bis[2-methyl-4-(1H-pyrrol-1-yl)-1H-inden-1-yl](dimethyl)silanes (8)

To a solution of 19.8 g (101 mmol) of 6 in a mixture of 200 ml of toluene and 10 ml of THF 40.5 ml of 2.5 M $^n$BuLi (47.8 mmol) in hexanes was added at 10° C. This mixture was stirred for 1 h at 20° C. and then cooled to 0° C. At this temperature, 6.14 ml (6.53 g, 50.6 mmol) of Me$_2$SiCl$_2$ was added. The resulting mixture was stirred for 3 h at ambient temperature and then for 1 hour at reflux. Further on, 100 ml of water was added. The organic layer was separated. The aqueous layer was washed by 2×200 ml of methyl-tert-butyl ether. The combined extract was dried over K$_2$CO$_3$ and evaporated to dryness. The crude product was purified by flash chromatography on Silica Gel 60 (40-63 μm, d 40 mm, h 300 mm; eluent: hexanes/dichloromethane, 2:1, vol.). Yield 13.7 g (61%) of white solid of a ca. 1 to 1 mixture of rac- and meso-compounds. Anal. calc. for $C_{30}H_{30}N_2Si$: C, 80.67; H, 6.77. Found: C, 80.84; H, 6.82. $^1$H NMR (CDCl$_3$): δ 7.38 (d, J=7.4 Hz, 2H, 5,5'-H in rac- or meso-compound), 7.28 (d, J=7.3 Hz, 2H, 5,5'-H in meso- or rac-compound), 7.10-7.21 (m, 8H, 6,6',7,7'-H in rac- and meso-compounds), 7.01 (t, J=2.1 Hz, 8H, 2,2',5,5'-H in pyrrole in rac- and meso-compounds), 6.77 (m, 2H, 3,3'-H in rac- or meso-compound), 6.74 (m, 2H, 3,3'-H in meso- or rac-compound), 6.36 (t, J=2.1 Hz, 4H, 3,3',4,4'-H in pyrrole in rac- or meso-compound), 6.35 (t, J=2.1 Hz, 4H, 3,3',4,4'-H in pyrrole in rac- or meso-compound), 3.77 (br.s, 2H, CHSi, CHSi' in rac- or meso-compound), 3.76 (br.s, 2H, CHSi, CHSi' in meso- or rac-compound), 2.23 (d, J=1.2 Hz, 6H, 2,2'-Me in rac or meso-compound), 2.13 (d, J=1.2 Hz, 6H, 2,2'-Me in meso- or rac-compound), −0.167 (s, 6H, SiMe₂ in rac-compound), −0.17 (s, 3H, SiMe in meso-compound), −0.22 (s, 3H, SiMe' in meso-compound). $^{13}$C{$^1$H} NMR (CDCl₃): δ 148.3, 148.2, 146.68, 146.65, 138.8, 138.7, 133.43, 133.40, 124.11, 124.07, 123.57, 123.52, 121.40, 121.35, 121.29, 120.53, 120.50, 109.22, 109.18, 48.0, 47.9, 17.9, 17.8, −5.47, −5.50, −5.52.

Preparation of a Mixture of rac- and meso-bis[2-methyl-4-(1H-indol-1-yl)-1H-inden-1-yl](dimethyl)silanes (9)

To a solution of 18.2 g (74.0 mmol) of 7 in 200 ml of toluene 29.6 ml of 2.5 M "BuLi (74.0 mmol) in hexanes were added at room temperature. This mixture was stirred for 1.5 h at 20° C., then 10 ml of THF was added. The resulted mixture was cooled to −30° C. At this temperature, 4.49 ml (4.78 g, 37.0 mmol) of Me₂SiCl₂ was added. The resulted mixture was stirred for 1 hour at ambient temperature, then for 1 hour at reflux. To this mixture 50 ml of water was added. The organic layer was separated. The aqueous layer was washed by 3×30 ml of ether. The combined extract was dried over K₂CO₃, and evaporated to dryness. The crude product was purified by flash chromatography on Silica Gel 60 (40-63 μm, d 40 mm, h 300 mm; eluent: hexanes/dichloromethane, 2:1, vol.). Yield 16.0 g (79%) of white solid of ca. 1 to 1 mixture of rac- and meso-compounds. Anal. calc. for C₃₈H₃₄N₂Si: C, 83.47; H, 6.27. Found: C, 83.66; H, 6.35. $^1$H NMR (CDCl₃): δ 7.70-7.74 (m, 4H, 5,5'-H in indolyl of rac- and meso-isomers), 7.53 (d, J=7.4 Hz, 2H, 5,5'-H in indenyl of meso-isomer), 7.43 (d, J=7.4 Hz, 2H, 5,5'-H in indenyl of rac-isomer), 7.10-7.39 (m, 20H, 6,6',7,7'-H in indenyl and 4,4',6,6',7,7'-H in indolyl of rac- and meso-isomers), 6.71 (m, 4H, 3,3'-H in indolyl of rac- and meso-isomers), 6.44 (m, 4H, 3,3'-H in indenyl of rac- and meso-isomers), 3.89 (m, 2H, 1,1'-H in indenyl of meso-isomer), 3.87 (m, 2H, 1,1'-H in indenyl of rac-isomer), 2.24 (d, J=1.1 Hz, 6H, 2,2'-Me in indenyls of rac-isomer), 2.17 (d, J=1.1 Hz, 6H, 2,2'-Me in indenyls of meso-isomer), −0.11 (s, 3H, SiMe of meso-isomer), −0.14 (s, 3H, SiMe₂ of rac-isomer), −0.15 (s, 3H, SiMe' of meso-isomer). $^{13}$C{$^1$H} NMR (CDCl₃): δ 148.43, 148.40, 146.73, 146.70, 141.22, 141.15, 136.7, 131.42, 131.39, 128.9, 124.4, 123.73, 123.67, 122.99, 122.96, 122.14, 122.08, 122.0, 120.9, 119.0, 110.9, 102.8, 48.1, 48.0, 18.01, 17.97, −5.5, −5.72, −5.76.

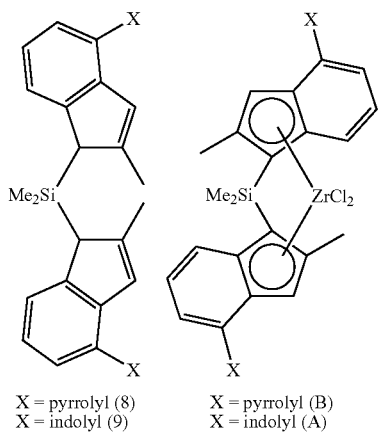

X = pyrrolyl (8)
X = indolyl (9)

X = pyrrolyl (B)
X = indolyl (A)

Preparation of Transition Metal Complex rac-B

To a solution of 16.7 g (37.3 mmol) of 8 in a mixture of 200 ml of toluene and 50 ml of ether 30.0 ml of 2.5 M "BuLi (75 mmol) in hexanes was added at ambient temperature. This mixture was stirred for 1 hour at this temperature. Next, 19.3 g (80 mmol) of Et₃SnCl was added. The resulting mixture was stirred for 2 h and then evaporated to ca. 150 ml. To the residue 300 ml of toluene was added. This mixture was filtered through Celite 503. To the filtrate 8.70 h (37.3 mmol) of ZrCl₄ was added at vigorous stirring. The orange suspension formed was stirred for 2.5 h at ambient temperature and then 1 h at reflux. The obtained mixture was cooled to ambient temperature. The orange precipitate was filtered off (glass frit, G4), washed by 60 ml of toluene, and dried in vacuum. This procedure gave 16.1 g (71%) of a ca. 1 to 1 mixture of rac- and meso-complexes. Pure rac-B was obtained by fractional crystallization from dichloromethane. Yield 6.12 g (27%). Anal. calc. for C₃₀H₂₈Cl₂N₂SiZr: C, 59.38; H, 4.65. Found: C, 59.27; H, 4.59. $^1$H NMR (CD₂Cl₂): δ 7.60 (dt, J=8.7 Hz, J=0.8 Hz, 2H, 5,5'-H), 7.24 (dd, J=7.3 Hz, J=0.8 Hz, 2H, 7,7'-H), 7.09 (dd, J=8.7 Hz, J=7.3 Hz, 2H, 6,6'-H), 7.08 (t, J=2.2 Hz, 4H, 2,2',5,5'-H in pyrrole), 6.94 (m, 2H, 3,3'-H), 6.28 (t, J=2.2 Hz, 4H, 3,3',4,4'-H in pyrrole), 2.21 (d, J=0.5 Hz, 6H, 2,2'-Me), 1.32 (s, 6H, SiMe₂).

Preparation of Transition Metal Complexes rac-A and meso-A

To a solution of 16.0 g (29.2 mmol) of 9 in a mixture of 200 ml of toluene and 50 ml of ether 25.0 ml of 2.5 M "BuLi (62.5 mmol) in hexanes was added at ambient temperature. This mixture was stirred for 2 h at this temperature; then, 15.2 g (63.0 mmol) of Et₃SnCl was added. The resulting mixture was stirred for 3 h, evaporated to ca. 100 ml, and then 100 ml of toluene was added. This mixture was filtered through Celite 503. To the filtrate 7.13 g (30.6 mmol) of ZrCl₄ was added at vigorous stirring. The orange suspension formed was stirred for 1 h at ambient temperature and then 4 h at 100° C. The obtained warm mixture was filtered through glass frit (G4) to give red crystalline material and red filtrate. The crystalline precipitate was washed by 100 ml of toluene and dried in vacuum. This procedure gave 5.67 g (28%) of pure meso-A. Crystals precipitated from the red filtrate at 5° C. were filtered off (glass frit G3) and dried in vacuum. In this manner, a ca. 3 to 1 mixture of rac- and meso-A was obtained. Yield 3.16 g (15%). The filtrate was evaporated to dryness. The residue was dissolved in 50 ml of dichloromethane, and 50 ml of hexanes was added. Crystals precipitated from this mixture at −30° C. were collected and dried in vacuum. This procedure gave pure rac-A. Yield 1.22 g (6%). rac-A. Anal. calc. for C₃₈H₃₂Cl₂N₂SiZr: C, 64.57; H, 4.56. Found: C, 64.44; H, 4.51 $^1$H NMR (CD₂Cl₂), rac-A: δ 7.69 (dt, J=8.7 Hz, J=0.7 Hz, 2H, 5,5'-H), 7.62 (m, 2H, 5,5'-H in indolyl), 7.56 (d, J=3.3 Hz, 2H, 2,2'-H in indolyl), 7.49 (dd, J=7.3 Hz, J=0.7 Hz, 2H, 7,7'-H), 7.41 (m, 2H, 6,6'-H in indolyl), 7.17 (dd, J=8.7 Hz, J=7.3 Hz, 2H, 6,6'-H), 7.07-7.15 (m, 4H, 4,4',7,7'-H in indolyl), 6.75 (s, 2H, 3,3'-H in indenyl), 6.63 (m, 2H, 3,3'-H in indolyl), 2.40 (d, J=0.5 Hz, 6H, 2,2'-Me), 1.35 (s, 6H, SiMe₂). meso-A. Anal. calc. for C₃₈H₃₂Cl₂N₂SiZr: C, 64.57; H, 4.56. Found: C, 64.68; H, 4.63. $^1$H NMR (CD₂Cl₂): δ 7.73 (dt, J=8.7 Hz, J=0.7 Hz, 2H, 5,5'-H), 7.61 (m, 2H, 5,5'-H in indolyl), 7.53 (d, J=3.3 Hz, 2H, 2,2'-H in indolyl), 7.30 (m, 2H, 6,6'-H in indolyl), 7.27 (dd, J=7.3 Hz, J=0.7 Hz, 2H, 7,7'-H), 7.06-7.11 (m, 4H, 4,4',7,7'-H in indolyl), 6.96 (dd, J=8.7 Hz, J=7.3 Hz, 2H, 6,6'-H), 6.61-6.64 (m, 4H, 3,3'-H in indenyl and 3,3'-H in indolyl), 2.40 (d, J=0.5 Hz, 6H, 2,2'-Me), 1.50 (s, 3H, SiMe), 1.25 (s, 3H, SiMe').

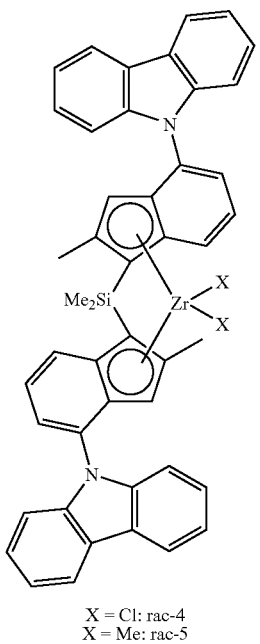

X = Cl: rac-4
X = Me: rac-5 rac-A          rac-B

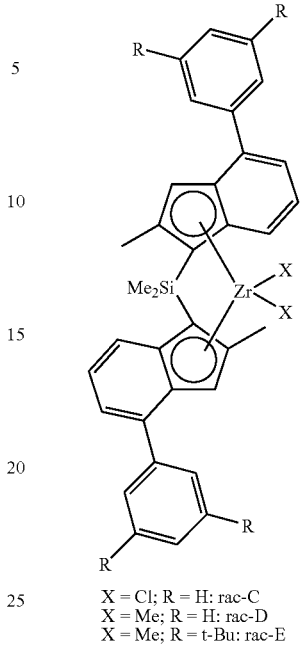

X = Cl; R = H: rac-C
X = Me; R = H: rac-D
X = Me; R = t-Bu: rac-E

Small Scale Propylene Polymerizations:

In the following experiments pressure is reported in atmospheres (atm) and pounds per square inch (psi).

Transition metal compound (TMC) solutions were typically prepared using toluene (ExxonMobil Chemical—anhydrous, stored under $N_2$) (98%). Unless otherwise mentioned, TMC solutions are 0.6 mmol/L in toluene. In some cases, the TMC was diluted in toluene and pre-activated with 20 equivalents of MAO. In these instances, TMC solutions were typically 0.6 mmol TMC/L and 12 mmol MAO/L in toluene. Millimoles of MAO reported are based on the millimoles of aluminum in MAO, where MAO has the formula weight of 58.0 grams/mole.

Solvents, polymerization grade toluene, isohexanes, and hexanes were supplied by ExxonMobil Chemical Co. and thoroughly dried and degassed prior to use.

Polymerization grade ethylene was used and further purified by passing it through a series of columns: 500 cc Oxyclear cylinder from Labelear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Polymerization grade propylene was used and further purified by passing it through a series of columns: 2250 cc Oxyclear cylinder from Labelear followed by a 2250 cc column packed with dried 3 Å mole sieves purchased from Aldrich Chemical Company, two 500 cc columns packed with dried 5 Å mole sieves purchased from Aldrich Chemical Company, a 500 cc Selexsorb CD column, and a 500 cc Selexsorb COS column.

MAO (methylalumoxane, 10 wt % in toluene) was purchased from Albemarle Corporation and was used as a 1 wt % or 2 wt % in toluene solution. Micromoles of MAO reported in the experimental section are based on the micromoles of aluminum in MAO. The formula weight of MAO is 58.0 grams/mole.

Small scale polymerizations were conducted in an inert atmosphere ($N_2$) drybox using autoclaves equipped with an external heater for temperature control, glass inserts (internal volume of reactor=22.5 mL), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Prior to a polymerization run, the reactor was prepared as described above, then heated to 40° C. and then purged with propylene gas at atmospheric pressure. Hexanes or isohexanes, MAO, and liquid propylene were added via syringe. The reactor was then heated to process temperature while stirring at 800 RPM. The pre-activated TMC (0.6 mmol TMC/L and 12 mmol Al/L) was added via syringe with the reactor at process conditions. Amounts of reagents not specified above are given in Table 1. Reactor temperature was monitored and typically maintained within +/−1° C. Polymerizations were halted by addition of approximately 50 psi of ultra high purity air to the autoclaves for approximately 30 seconds. The polymerizations were quenched based on a predetermined pressure as indicated by "Quench Value", or if the quench value was not reached, by a maximum time as indicated by "Maximum Reaction Time". Both values, in addition to the actual quench time, are reported in Table 1 for each run. After quenching, the reactors were cooled and vented. The polymer was isolated after the solvent was removed in-vacuo. Yields reported include total weight of polymer and residual catalyst. Catalyst activity is reported as grams of polymer per mmol transition metal compound per hour of reaction time (g/mmol-hr).

Small Scale Polymer Characterization:

Polymer characterization results for small scale polypropylene samples are reported in Table 2.

For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution is between 0.1 to 0.9 mg/mL with a BHT concentration of 1.25 mg BHT/mL of TCB. Samples are cooled to 135° C. for testing.

High temperature size exclusion chromatography was performed using an automated "Rapid GPC" system. (See U.S. Pat. No. 6,491,816, which is incorporated herein by reference). Mw, Mn, and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples (250 uL of a polymer solution in TCB were injected into the system) were run at an eluent flow rate of 2.0 mL/min (135° C. sample temperatures, 165° C. oven/columns) using three Polymer Laboratories: PLgel 10 µm Mixed-B 300×7.5 mm columns in series. No column spreading corrections were employed. Numerical analyses were performed using Epochg software available from Symyx Technologies. The molecular weights obtained and reported are relative to linear polystyrene standards (not corrected to polypropylene values).

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period. The results are reported in the tables as $T_m$ (° C.). $T_m$ is also referred to as the primary $T_m$ or primary melting temperature.

Conventional GPC DRI as reported in the footnotes of Table 2 were measured as described in the Continuous Reactor Polymerizations section below.

Polymer samples for $^{13}C$ NMR spectroscopy were dissolved in $d_2$-1,1,2,2-tetrachloroethane and the samples were recorded at 125° C. using a NMR spectrometer with a $^{13}C$ NMR frequency of 100 or 175 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977.

TABLE 1

Small Scale Propylene Polymerizations.

| Ex. # | TMC | TMC (umol) | MAO/ TMC (molar) | Reactor diluent | Total Solvent[1] (uL) | propylene (uL) | Polym Temp (° C.) | Quench Value (psi) | Maximum Reaction Time (min) | quench time (s) | yield (g) | Activity (g/mmol · hr) |
|---|---|---|---|---|---|---|---|---|---|---|---|---|
| 1 | rac-4 | 0.08 | 500 | hexane | 4032 | 1066 | 70 | 5 | 15 | 196 | 0.1246 | 28607 |
| 2 | rac-4 | 0.08 | 500 | hexane | 4032 | 1066 | 70 | 5 | 15 | 179 | 0.1224 | 30737 |
| 3 | rac-4 | 0.08 | 500 | hexane | 4032 | 1066 | 70 | 5 | 15 | 204 | 0.1106 | 24361 |
| 4 | rac-4 | 0.08 | 500 | isohexane | 4098 | 1000 | 70 | 15 | 15 | 691 | 0.1708 | 11125 |
| 5 | rac-4 | 0.08 | 500 | isohexane | 4098 | 1000 | 70 | 15 | 15 | 588 | 0.2026 | 15516 |
| 6 | rac-4 | 0.08 | 500 | isohexane | 4098 | 1000 | 70 | 15 | 15 | 706 | 0.1980 | 12613 |
| 7 | rac-4 | 0.08 | 500 | isohexane | 4098 | 1000 | 70 | 15 | 15 | 656 | 0.1355 | 9289 |
| 8 | rac-4 | 0.08 | 500 | isohexane | 4098 | 1000 | 70 | 15 | 15 | 680 | 0.1325 | 8765 |
| 9 | rac-4 | 0.08 | 500 | isohexane | 4098 | 1000 | 70 | 15 | 15 | 652 | 0.1789 | 12349 |
| C1 | rac-A | 0.08 | 500 | hexane | 4032 | 1066 | 70 | 5 | 15 | 99 | 0.1587 | 72283 |
| C2 | rac-A | 0.08 | 500 | hexane | 4032 | 1066 | 70 | 5 | 15 | 91 | 0.1398 | 68829 |
| C3 | rac-A | 0.08 | 500 | hexane | 4032 | 1066 | 70 | 5 | 15 | 98 | 0.1569 | 72193 |
| C4 | rac-A | 0.08 | 500 | isohexane | 4098 | 1000 | 70 | 20 | 20 | 334 | 0.2018 | 27172 |
| C5 | rac-A | 0.08 | 500 | isohexane | 4098 | 1000 | 70 | 20 | 20 | 355 | 0.2338 | 29645 |
| C6 | rac-A | 0.08 | 500 | isohexane | 4098 | 1000 | 70 | 20 | 20 | 377 | 0.2437 | 29066 |

TABLE 1-continued

Small Scale Propylene Polymerizations.

| Ex. # | TMC | TMC (umol) | MAO/TMC (molar) | Reactor diluent | Total Solvent[1] (uL) | propylene (uL) | Polym Temp (° C.) | Quench Value (psi) | Maximum Reaction Time (min) | quench time (s) | yield (g) | Activity (g/mmol · hr) |
|---|---|---|---|---|---|---|---|---|---|---|---|---|
| C7 | rac-B | 0.08 | 500 | hexane | 4032 | 1066 | 70 | 5 | 15 | 105 | 0.1531 | 65552 |
| C8 | rac-B | 0.08 | 500 | hexane | 4032 | 1066 | 70 | 5 | 15 | 148 | 0.1017 | 30964 |
| C9 | rac-B | 0.08 | 500 | hexane | 4032 | 1066 | 70 | 5 | 15 | 101 | 0.1540 | 68751 |
| C10 | rac-B | 0.08 | 500 | hexane | 4032 | 1066 | 70 | 5 | 15 | 123 | 0.1279 | 46755 |
| C11 | rac-B | 0.08 | 500 | hexane | 4032 | 1066 | 70 | 5 | 15 | 92 | 0.1672 | 82051 |
| C12 | rac-B | 0.08 | 500 | hexane | 4032 | 1066 | 70 | 5 | 15 | 101 | 0.1673 | 74910 |
| C13 | rac-B | 0.08 | 500 | isohexane | 4098 | 1000 | 70 | 20 | 20 | 229 | 0.2407 | 47361 |
| C14 | rac-B | 0.08 | 500 | isohexane | 4098 | 1000 | 70 | 20 | 20 | 223 | 0.2794 | 56280 |
| C15 | rac-B | 0.08 | 500 | isohexane | 4098 | 1000 | 70 | 20 | 20 | 215 | 0.2403 | 50272 |
| C16 | rac-C | 0.075 | 531 | isohexane | 4098 | 1000 | 70 | 20 | 20 | 73 | 0.3323 | 217937 |
| C17 | rac-C | 0.075 | 531 | isohexane | 4098 | 1000 | 70 | 20 | 20 | 73 | 0.2636 | 173118 |
| C18 | rac-C | 0.075 | 531 | isohexane | 4098 | 1000 | 70 | 20 | 20 | 68 | 0.3681 | 260371 |
| 10 | rac-4 | 0.08 | 500 | isohexane | 4098 | 1000 | 100 | 15 | 15 | 304 | 0.1369 | 20285 |
| 11 | rac-4 | 0.08 | 500 | isohexane | 4098 | 1000 | 100 | 15 | 15 | 286 | 0.1363 | 21453 |
| 12 | rac-4 | 0.08 | 500 | isohexane | 4098 | 1000 | 100 | 15 | 15 | 322 | 0.1384 | 19318 |
| 13 | rac-4 | 0.08 | 500 | isohexane | 4098 | 1000 | 100 | 15 | 15 | 300 | 0.1299 | 19504 |
| 14 | rac-4 | 0.08 | 500 | isohexane | 4098 | 1000 | 100 | 15 | 15 | 303 | 0.1501 | 22300 |
| 15 | rac-4 | 0.08 | 500 | isohexane | 4098 | 1000 | 100 | 15 | 15 | 320 | 0.1191 | 16733 |
| C19 | rac-A | 0.08 | 500 | isohexane | 4098 | 1000 | 100 | 20 | 20 | 278 | 0.1847 | 29908 |
| C20 | rac-A | 0.08 | 500 | isohexane | 4098 | 1000 | 100 | 20 | 20 | 207 | 0.1813 | 39489 |
| C21 | rac-A | 0.08 | 500 | isohexane | 4098 | 1000 | 100 | 20 | 20 | 298 | 0.1815 | 27389 |
| C22 | rac-B | 0.08 | 500 | isohexane | 4098 | 1000 | 100 | 20 | 20 | 189 | 0.1983 | 47264 |
| C23 | rac-B | 0.08 | 500 | isohexane | 4098 | 1000 | 100 | 20 | 20 | 175 | 0.1951 | 50312 |
| C24 | rac-B | 0.08 | 500 | isohexane | 4098 | 1000 | 100 | 20 | 20 | 186 | 0.2007 | 48530 |
| C25 | rac-C | 0.075 | 531 | isohexane | 4098 | 1000 | 100 | 20 | 20 | 61 | 0.2890 | 228073 |
| C26 | rac-C | 0.075 | 531 | isohexane | 4098 | 1000 | 100 | 20 | 20 | 56 | 0.2955 | 252393 |
| C27 | rac-C | 0.075 | 531 | isohexane | 4098 | 1000 | 100 | 20 | 20 | 56 | 0.2961 | 253813 |

[1]Total solvent includes hexane or isohexane in addition to the amount of toluene added with the catalyst. Typically, the total of all liquids in the reactor was 5.1 mL.

TABLE 2

Small Scale Propylene Polymerization Polymer Characteristics.

| Ex. # | TMC | Mn (g/mol) | Mw (g/mol) | PDI | Primary $T_m$ (° C.) |
|---|---|---|---|---|---|
| 1 | rac-4 | 721655 | 1057399 | 1.47 | 157.9 |
| 2 | rac-4 | 768151 | 1110548 | 1.45 | |
| 3 | rac-4 | 702592 | 1055662 | 1.50 | 156.8 |
| 4 | rac-4 | 819208 | 1150050 | 1.40 | 157.1 |
| 5 | rac-4 | 525234 | 991247 | 1.89 | 157.8 |
| 6 | rac-4 | 728609 | 1124202 | 1.54 | 157.3 |
| 7 | rac-4 | 765034 | 1101564 | 1.44 | 157.2 |
| 8 | rac-4 | 772306 | 1173134 | 1.52 | 157.9 |
| 9* | rac-4 | 751244 | 1072754 | 1.43 | 159.9 |
| Ave 1-9 | ave rac-4 | 728226 | 1092951 | 1.52 | 157.7 |
| C1 | rac-A | 251299 | 392485 | 1.56 | 157.6 |
| C2 | rac-A | 278155 | 432514 | 1.55 | 156.7 |
| C3 | rac-A | 262895 | 413093 | 1.57 | 157.9 |
| C4 | rac-A | 265451 | 389155 | 1.47 | 156.2 |
| C5 | rac-A | 264993 | 388818 | 1.47 | 156.0 |
| C6 | rac-A | 253986 | 379143 | 1.49 | 155.8 |
| Ave C1-6 | ave rac-A | 262797 | 399201 | 1.52 | 156.7 |
| C7 | rac-B | 169919 | 264706 | 1.56 | 153.2 |
| C8 | rac-B | 171001 | 261840 | 1.53 | 154.6 |
| C9 | rac-B | 155476 | 243492 | 1.57 | 152.5 |
| C10 | rac-B | 170640 | 266572 | 1.56 | 153.7 |
| C11 | rac-B | 144785 | 232378 | 1.60 | 153.5 |
| C12 | rac-B | 142601 | 234385 | 1.64 | 153.7 |
| C13 | rac-B | 127788 | 189645 | 1.48 | 154.1 |
| C14 | rac-B | 138976 | 207478 | 1.49 | 155.0 |
| C15 | rac-B | 120640 | 181758 | 1.51 | 154.7 |
| Ave C7-15 | ave rac-B | 149106 | 231362 | 1.55 | 153.9 |
| C16 | rac-C | 56872 | 114974 | 2.02 | 152.3 |
| C17 | rac-C | 59947 | 119827 | 2.00 | 153.0 |
| C18 | rac-C | 50146 | 116101 | 2.32 | 151.8 |
| Ave C16-18 | ave rac-C | 55655 | 116967 | 2.11 | 152.4 |
| 10 | rac-4 | 190725 | 316437 | 1.66 | 156.6 |
| 11 | rac-4 | 197114 | 310112 | 1.57 | 157.0 |
| 12** | rac-4 | 207479 | 318331 | 1.53 | 156.8 |
| 13 | rac-4 | 179814 | 288837 | 1.61 | 156.5 |
| 14 | rac-4 | 214360 | 316777 | 1.48 | 158.2 |
| 15 | rac-4 | 171710 | 271795 | 1.58 | 155.9 |
| Ave 10-15 | ave rac-4 | 193534 | 303715 | 1.57 | 156.8 |
| C19 | rac-A | 92726 | 137636 | 1.48 | 152.3 |
| C20 | rac-A | 89537 | 132359 | 1.48 | 152.3 |
| C21 | rac-A | 92602 | 139293 | 1.50 | 152.0 |
| Ave C19-21 | ave rac-A | 91622 | 136429 | 1.49 | 152.2 |
| C22 | rac-B | 45335 | 68889 | 1.52 | 148.6 |
| C23 | rac-B | 45742 | 69741 | 1.52 | 148.8 |
| C24 | rac-B | 48175 | 72748 | 1.51 | 148.6 |
| Ave C22-23 | ave rac-B | 46417 | 70459 | 1.52 | 148.7 |
| C25 | rac-C | 16229 | 42151 | 2.60 | 144.7 |
| C26 | rac-C | 17298 | 42033 | 2.43 | 145.5 |
| C27 | rac-C | 15928 | 40357 | 2.53 | 145.2 |
| Ave C25-27 | ave rac-C | 16485 | 41514 | 2.52 | 145.1 |

*Additional data for example 9. As measured from $^{13}$C NMR: m (0.996), r (0.004), mm (0.993), mr (0.005), rr (0.002), mmmm (0.9895), mmmr (0.0031), rmmr (0.0006), mmrr (0.0033), mmrm + rmrr (0.0005), rmrm (0.0008), rrrr (0.0005), mrrr (0.0004), mrrm (0.0013), stereo defects/10000 monomer (23), 2,1-regio (e) defects/10000 monomer (22), 2,1-regio (t) defects/10000 monomer (0), 1,3 regio defects/10000 monomer (2), total defects/10000 monomer (47), ave. meso run length (212). As measured from conventional GPC DRI and converted to polypropylene molecular weights: Mn (354,929 g/mol), Mw (665,370 g/mol), PDI (1.87).

**Additional data for example 12. As measured from $^{13}$C NMR: m (0.989), r (0.011), mm (0.983), mr (0.012), rr (0.005), mmmm (0.9754), mmmr (0.0063), rmmr (0.0014), mmrr (0.0072), mmrm + rmrr (0.0025), rmrm (0.0025), rrrr (0.0009), mrrr (0.0012), mrrm (0.0025), stereo defects/10000 monomer (60), 2,1-regio (e) defects/10000 monomer (18), 2,1-regio (t) defects/10000 monomer (0), 1,3 regio defects/10000 monomer (12), total defects/10000 monomer (90), ave. meso run length (111). As measured from conventional GPC DRI and converted to polypropylene molecular weights: Mn (102,261 g/mol), Mw (204,710 g/mol), PDI (2.00), g/mol).

Figure 2:
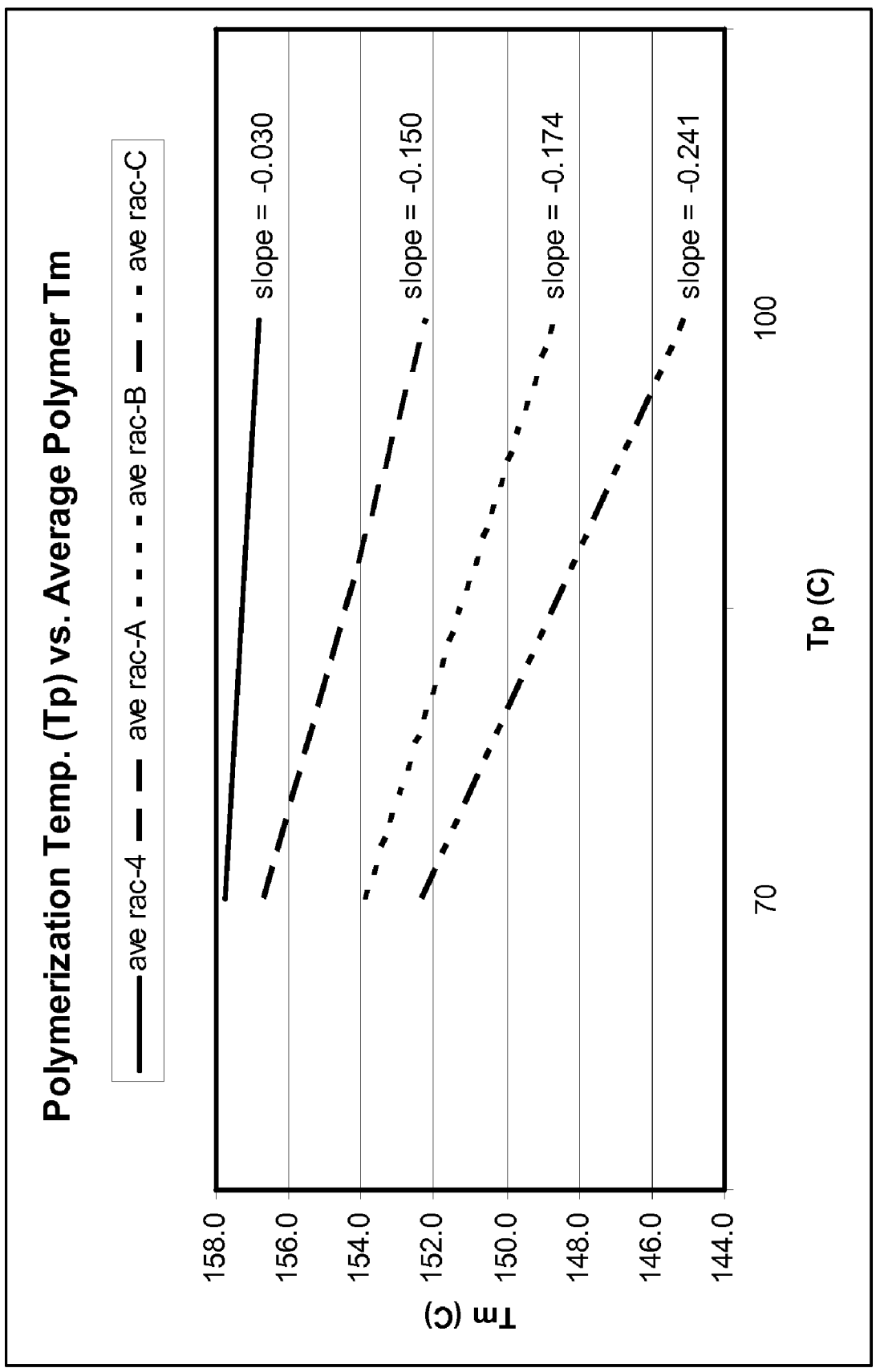
FIG. 2 is a graph of the polymerization temperature (° C.) vs. the average primary melting temperature (° C.) for the polypropylene products produced according to polymerization examples 1-15 and comparative examples C1-C27.

Table 2 contains average values for polymer $T_m$ as plotted in FIG. 2. FIG. 2 shows that catalyst rac-4 not only produces a polymer with higher crystallinity based on $T_m$, but also has less of a lowering of polymer crystallinity as the reactor temperature is increased from 70° C. to 100° C. as compared to the polymers produced from catalysts rac-A, rac-B and rac-C. The slope which indicates a decrease in $T_m$ in going from a $T_p$ of 70° C. to 100° C. for the average rac-4 data is −0.030. According to the data in Table 2, even if the highest $T_m$ at a $T_p$ of 70° C. is used along with the lowest $T_m$ at a $T_p$ of 100° C., the slope is calculated to be −0.113 which is still less of a decline in $T_m$ with increased $T_p$ than for any of the other polymers produced from catalysts rac-A, rac-B and rac-C.

Continuous Reactor Polymerizations:

All polymerizations were performed in a liquid filled, single-stage continuous reactor. The reactor was a 0.5-liter stainless steel autoclave reactor and was equipped with a stirrer, water cooling/steam heating element with a temperature controller, and a pressure controller. Solvent and propylene were first purified by passing through a three-column purification system. The purification system consisted of an Oxiclear column (Model # RGP-R1-500 from Labelear) followed by a 5 Å and a 3 Å molecular sieve columns. Purification columns were regenerated periodically whenever there was evidence of lower activity of polymerization. Both the 3 Å and 5 Å molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brooksfield mass flow meters or Micro-Motion Coriolis-type flow meters.

The transition metal compound (TMC) was pre-activated with [N,N-dimethylanilinium][tetrakis(pentafluorophenyl) borate] (obtained from Albemarle) at a molar ratio of about 1:1 in toluene. The catalyst solution was kept in an inert atmosphere with <1.5 ppm borane water content and was fed into reactor by a metering pump through a separated line. Catalyst and monomer contacts took place in the reactor.

As an impurity scavenger, 250 ml of tri-n-octyl aluminum (TNOA) (25 wt % in hexane, Sigma Aldrich) was diluted in 22.83 kilogram of hexane. The TNOA solution was stored in a 37.9-liter cylinder under nitrogen blanket. The solution was used for all polymerization runs until about 90% of consumption, then a new batch was prepared. Pumping rates of the TNOA solution varied from polymerization reaction to reaction, ranging from 0 (no scavenger) to 4 ml per minutes.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using a water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g.

Mw, Mn, and Mz of the polymers were determined using gel permeation chromatography (GPC) on a PL220 (Polymer Laboratories) high temperature chromatographic unit equipped with a DRI detector and four linear mixed bed columns (Polymer Laboratories PLgel Mixed-B LS, 20-micron particle size). The oven temperature was at 160° C. with the autosampler hot zone at 160° C. and the warm zone at 145° C. About 0.2 wt. % of polymer sample was dissolved in 1,2,4-trichlorobenzene containing 200 ppm 2,6-di-t-butyl-4-methylphenol. The flow rate was 1.0 milliliter/minute and the injection size is 100 microliters. Columns were calibrated against polystyrene standards. Molecular weights reported are converted to polypropylene molecular weights through the use of the following Mark Houwink coefficients: $K_{PP}=2.288\times10^{-4}$; $\alpha_{PP}=0.705$; $K_{PS}=1.75\times10^{-4}$; $\alpha_{PS}=0.67$ where PS is polystyrene and PP is polypropylene. Mark Houwink coefficients were corrected for propylene content for ethylene/propylene copolymers and are reported in Table 3.

The ethylene content of ethylene/propylene copolymers produced was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm$^{-1}$ to 4000 cm$^{-1}$ was recorded and the ethylene content in wt. % was calculated according to the following equation:

ethylene content(wt.%)=72.698−86.495$X$+13.696$X^2$ where $X$=AR/(AR+1). The area under propylene band at ~1165 cm$^{-1}$ and the area of ethylene band at ~732 cm$^{-1}$ in the spectrum were calculated. The baseline integration range for the methylene rocking band is nominally from 695 cm$^{-1}$ to the minimum between 745 and 775 cm$^{-1}$. For the polypropylene band the baseline and integration range is nominally from 1195 to 1126 cm$^{-1}$. AR is the ratio of the area for the peak at ~1165 cm$^{-1}$ to the area of the peak at ~732 cm$^{-1}$.

Peak melting point ($T_m$) and peak crystallization temperature ($T_c$) were determined using the following procedure according to ASTM E 794-85. Crystallinity was calculated using $H_f$ determined using ASTM D 3417-99. Differential scanning calorimetric (DSC) data were obtained using a TA Instruments model Q100 machine. Samples weighing approximately 5-10 mg were sealed in an aluminum hermetic sample pan. The DSC data were recorded by first gradually heating it to 200° C. at a rate of 10° C./minute. The sample was kept at 200° C. for 2 minutes before a second cooling-heating cycle was applied. Both the first and second cycle thermal events were recorded. Areas under the melting curves were measured and used to determine the $H_f$ and the degree of crystallinity. The percent crystallinity is calculated using the formula, [area under the curve (Joules/gram)/B (Joules/gram)]*100, where B is the $H_f$ for the homopolymer of the major monomer component. These values for B were obtained from the Polymer Handbook, Fourth Edition, published by John Wiley and Sons, New York 1999. A value of 189 J/g (B) was used as the $H_f$ for 100% crystalline polypropylene. The melting and crystallization temperatures reported here were obtained during the second heating/cooling cycle.

Continuous reactor polymerization and characterization data for ethylene/propylene copolymerizations and propylene homopolymerizations are summarized in Tables 3 and 4, respectively.

TABLE 3

Ethylene-Propylene copolymerizations data using a continuous reactor.

| Ex. # | TMC[1] | Catalyst rate (mol/min) | Polym. Temp (° C.) | Propylene (g/min) | ethylene (SLPM)[2] | hexanes (ml/min) | Yield (gram/min) | Mn_DRI[3] (g/mol) | Mw_DRI[3] (g/mol) | Mz_DRI[3] (g/mol) | MWD | Ethylene (wt %) |
|---|---|---|---|---|---|---|---|---|---|---|---|---|
| EP-1 | rac-5 | 9.57E−07 | 110 | 14 | 5 | 80 | 20.50 | 4300 | 14690 | 26840 | 3.41 | 33.1 |
| EP-2 | rac-5 | 9.57E−07 | 100 | 14 | 5 | 80 | 20.80 | 5990 | 17070 | 29840 | 2.85 | 32.1 |
| EP-3 | rac-5 | 5.31E−07 | 90 | 14 | 5 | 80 | 19.70 | 6800 | 21120 | 36340 | 3.11 | 32.5 |
| EP-4 | rac-5 | 2.35E−07 | 80 | 14 | 5 | 80 | 16.80 | 11840 | 33880 | 57380 | 2.86 | 37.0 |
| EP-C1 | rac-D | 3.78E−07 | 80 | 12 | 4 | 80 | 14.20 | 9350 | 26650 | 48410 | 2.85 | 30.3 |
| EP-C2 | rac-D | 3.78E−07 | 70 | 12 | 4 | 80 | 13.60 | 11210 | 28420 | 49250 | 2.53 | 24.9 |

[1]TMC activated with activator F = [N,N-dimethylanilinium] [tetrakis(pentafluorophenyl)borate]; TMC rac-5 = rac-dimethylsilylene-bis(2-methyl-4-carbazolyl-indenyl)zirconium dimethyl; Comparative TMC rac-D = rac-dimethylsilylene-bis[(2-methyl-4-phenyl)indenyl]zirconium dimethyl.
[2]Standard liters of ethylene per minute.
[3]The Mark Houwink coefficients used for the GPC-DRI calculations were corrected for ethylene content as follows: α = 0.00000323 × (ethylene wt %) + 0.0002 and K = 0.701 for examples EP-1 to EP-4 and EP-C1 and K = 0.702 for example EP-C2

TABLE 4

Propylene polymerization data using a continuous reactor.

| Ex. # | TMC[1] | Catalyst rate (mol/min) | Polym. Temp (° C.) | Propylene (g/min) | hexane (ml/min) | Yield (g/min) | Mn_DRI (g/mol) | Mw_DRI (g/mol) | Mz_DRI (g/mol) | MWD | $T_c$ (° C.) | $T_m$ (° C.) | delta H (J/g) |
|---|---|---|---|---|---|---|---|---|---|---|---|---|---|
| PP-1 | rac-5 | 1.44E−06 | 130 | 14 | 80 | 10.28 | 19370 | 44460 | 75600 | 2.30 | 101.3 | 144.7 | 88.9 |
| PP-2 | rac-5 | 1.44E−06 | 120 | 14 | 80 | 10.74 | 28690 | 66420 | 112660 | 2.32 | 100.2 | 147.8 | 93.0 |
| PP-3 | rac-5 | 1.44E−06 | 110 | 14 | 80 | 11.45 | 48450 | 106260 | 185190 | 2.19 | 105.3 | 150.2 | 92.8 |
| PP-C1 | rac-D | 2.83E−07 | 130 | 14 | 90 | 12.95 | 4842 | 13770 | 25077 | 2.84 | 92.6 | 129.1 | 75.9 |
| PP-C2 | rac-D | 2.83E−07 | 120 | 14 | 90 | 13.40 | 6710 | 20476 | 37811 | 3.05 | 96.8 | 134.3 | 87.3 |
| PP-C3 | rac-D | 2.83E−07 | 110 | 14 | 90 | 13.83 | 9396 | 29384 | 55353 | 3.13 | 100.0 | 140.8 | 90.0 |

[1]TMC activated with activator F = [N,N-dimethylanilinium] [tetrakis(pentafluorophenyl)borate]; TMC rac-5 = rac-dimethylsilylene-bis(2-methyl-4-carbazolyl-indenyl)zirconium dimethyl; Comparative TMC rac-D = rac-dimethylsilylene-bis[(2-methyl-4-phenyl)indenyl]zirconium dimethyl.

Higher Pressure Propylene Polymerizations

Examples HPP-1 to HPP-5 and Comparative Examples HPP-C1 to HPP-C2

A 37 cc reactor equipped with a magnetic stir bar was heated to 120° C. for one hour under a stream of nitrogen in order to dry the reactor. The reactor was cooled and subsequently charged with tri-n-octyl aluminum (TNOA, 1.50 mL, 0.029 mmol) as a scavenger. The total amount of tri-n-octyl aluminum utilized was adjusted to maintain an Al:Zr molar ratio between 100 and 350:1, respectively. To the reactor was added liquid propylene (35 mL, 6.89 MPa) and the reactor heated to 120° C. After heating to this temperature, the pressure of the reactor increased to approximately 48.23 MPa, and the contents were stirred. Separately, in a nitrogen Glove Box, a stock solution of transition metal compound (TMC) was prepared (1 mg/mL) in dried, degassed toluene. Using a pipette, the stock solution (1.34 mL, 0.00175 mmol) was added to 8.66 mL of a toluene solution containing [N,N-dimethylanilinium][tetrakis(pentafluorophenyl)borate] (activator F) (0.00168 g, 0.0021 mmol) such that the activator: TMC molar ratio is ~1.2:1. This mixture was stirred at room temperature for approximately 15 minutes. Next, in the dry box, 5.5 mL of this activated TMC solution was charged to a previously dried syringe pump, sealed and attached to the 30 cc reactor. The activated TMC solution (1 mL; 0.000175 mmol TMC) was added by over pressurizing the feed line (68.9 MPa) above the reactor pressure (48.23 MPa). After the catalyst is added, propylene is added to attain a pressure of 68.9 MPa. The reactor is maintained at temperature and pressure for 30 minutes. The reaction is terminated by venting the reactor contents into a vessel attached to the reactor vent line. After cooling, product is recovered from the vent collector and the reactor. The product is dried in a vacuum oven for 12 hours and submitted for GPC and DSC analysis.

TABLE 5

Propylene polymerization data using 68.9 MPa propylene.

| | Example | | | | | | |
|---|---|---|---|---|---|---|---|
| | HPP-1 | HPP-2 | HPP-3 | HPP-4 | HPP-5 | HPP-C1 | HPP-C2 |
| TMC rac-5 (μmol) | 0.125 | 0.150 | 0.175 | 0.175 | 0.190 | — | — |
| TMC rac-D (μmol) | — | — | — | — | — | 0.100 | 0.090 |
| Reaction Temp. (° C.) | 120 | 120 | 120 | 120 | 120 | 120 | 120 |
| Activator F (μmol) | 0.15 | 0.18 | 0.21 | 0.21 | 0.23 | 0.12 | 0.11 |
| TNOA (mmol) | 0.029 | 0.029 | 0.029 | 0.029 | 0.029 | 0.029 | 0.029 |
| Al:Zr molar ratio | 229 | 191 | 164 | 164 | 151 | 287 | 319 |

TABLE 5-continued

Propylene polymerization data using 68.9 MPa propylene.

| | Example | | | | | | |
|---|---|---|---|---|---|---|---|
| | HPP-1 | HPP-2 | HPP-3 | HPP-4 | HPP-5 | HPP-C1 | HPP-C2 |
| Reactor Pressure (MPa) | 68.9 | 68.9 | 68.9 | 68.9 | 68.9 | 68.9 | 68.9 |
| Propylene concentration (M) | ~12.5 | ~12.5 | ~12.5 | ~12.5 | ~12.5 | ~12.5 | ~12.5 |
| Rxn Time (Min) | 30 | 30 | 30 | 30 | 30 | 30 | 30 |
| Yield (g) | 0.212 | 0.074 | 0.514 | 0.477 | 1.34 | 1.948 | 0.554 |
| Mw (g/mol) | 410818 | 403816 | 426147 | 423399 | 426559 | 152895 | 137195 |
| Mw/Mn | 2.61 | 2.58 | 3.35 | 3.00 | 3.25 | 1.97 | 2.17 |
| $T_m$ (° C.) | 155.4 | 154.7 | 155.5 | 154.8 | 155.1 | 153.3 | 151.6 |
| Hf (J/g) | 90.4 | 93.8 | 93.9 | 93.5 | 105.4 | 88.2 | 94.3 |

Activator F = [N,N-dimethylanilinium] [tetrakis(pentafluorophenyl)borate]
TNOA = tri-n-octyl aluminum
TMC rac-5 = rac-dimethylsilylene-bis(2-methyl-4-carbazolyl-indenyl)zirconium dimethyl
Comparative TMC rac-D = rac-dimethylsilylene-bis[(2-methyl-4-phenyl)indenyl]zirconium dimethyl Higher Pressure Propylene Polymerizations Examples HPP-6 to HPP-10 and Comparative Examples HPP-C3 to HPP-C6

A 37 cc stainless steel autoclave reactor equipped with a magnetic stir bar was heated to 120° C. for one hour under a stream of dry nitrogen in order to dry the reactor. The reactor was cooled and subsequently charged with hexane (20 mL, 13.18 g, 152.8 mmol) and tri-n-octyl aluminum (0.055 mmol; added in a 2.9 mL solution of hexane) as a scavenger. The total amount of tri-n-octyl aluminum utilized was adjusted to achieve a targeted Al:Zr molar ratio not greater than 350:1, respectively. The reactor was purged with propylene gas (purity>99%, Airgas Corporation) and then sealed to maintain an atmosphere of propylene. The reactor was then heated to 105° C., at which time more liquid propylene was added (16.0 mL; 8.176 g) via syringe pump to bring the pressure up to ~600 psi (4.1 MPa) and the contents were stirred. Separately in a nitrogen-purged dry box, two separate stock solutions were prepared of the transition metal compound (TMC) and [N,N-dimethylanilinium][tetrakis(pentafluorophenyl)borate] (Activator F) in dried, degassed toluene (both at a concentration of ~1 mg/mL). To a toluene solution of activator F (2.64 mL, 2.64 mg, 0.0033 mmol) was added the TMC (2.11 mL, 2.11 mg, 0.00275 mmol) and an additional 5.25 mL of dried, degassed toluene. This mixture was stirred at room temperature for approximately 15 minutes. Next, in the drybox, 5.5 mL of this activated TMC solution was charged to a previously dried syringe pump, sealed and attached to the 37 cc reactor. The activated TMC solution (~1 mL; 0.000275 mmol) was introduced by over-pressurizing the feed line via syringe pump (~1000 psi; 6.9 MPa) above the reactor pressure (~600 psi; 4.1 MPa). After activated TMC solution addition, propylene was added to maintain a pressure of 1000 psi (6.9 MPa). The reactor was maintained at a temperature of 105° C. and a pressure of 6.9 MPa for 30 minutes. Additional propylene was added to maintain the reactor pressure. The reaction was terminated by venting the contents into a vent collection vessel attached to the reactor vent line. After cooling, product was recovered from the vent collector and the reactor. The product was dried in a vacuum oven for 12 hours and product characterized by gel permeation chromatography (GPC) and differential scanning calorimetry (DSC).

TABLE 6

Propylene polymerization data using 6.9 MPa propylene

| | Ex. # | | | | | | | | |
|---|---|---|---|---|---|---|---|---|---|
| | HPP-6 | HPP-7 | HPP-8 | HPP-9 | HPP-10 | HPP-C3 | HPP-C4 | HPP-C5 | HPP-C6 |
| TMC rac-5 (μmol) | 0.190 | 0.200 | 0.250 | 0.300 | 0.300 | — | — | — | — |
| TMC rac-D (μmol) | — | — | — | — | — | 0.125 | 0.125 | — | — |
| TMC rac-E (μmol) | — | — | — | — | — | — | — | 0.210 | 0.223 |
| Activator F (μmol) | 0.23 | 0.24 | 0.30 | 0.36 | 0.36 | 0.15 | 0.15 | 0.25 | 0.27 |
| TNOA (mmol) | 0.029 | 0.029 | 0.038 | 0.061 | 0.061 | 0.029 | 0.029 | 0.029 | 0.048 |
| Al:Zr molar ratio | 151 | 143 | 153 | 204 | 204 | 229 | 229 | 137 | 215 |
| Propylene conc. (M) | ~3.55 | ~3.55 | ~3.55 | ~3.55 | ~3.55 | ~3.55 | ~3.55 | ~3.55 | ~3.55 |
| Yield (g) | 0.829 | 0.266 | 0.592 | 1.076 | 0.738 | 1.210 | 0.337 | 0.986 | 0.366 |
| Mw (g/mol) | 267973 | 243950 | 202412 | 189808 | 207434 | 85439 | 88850 | 139064 | 146391 |

TABLE 6-continued

Propylene polymerization data using 6.9 MPa propylene

| | Ex. # | | | | | | | | |
|---|---|---|---|---|---|---|---|---|---|
| | HPP-6 | HPP-7 | HPP-8 | HPP-9 | HPP-10 | HPP-C3 | HPP-C4 | HPP-C5 | HPP-C6 |
| Mw/Mn | 2.44 | 2.42 | 1.97 | 2.15 | 2.3 | 2.00 | 2.04 | 1.99 | 1.97 |
| $T_m$ (° C.) | 156.4 | 156.5 | 155.8 | 156.0 | 154.9 | 153.5 | 153.1 | 154.8 | 154.4 |
| Hf (J/g) | 100.1 | 97.5 | 99.3 | 103.0 | 102.5 | 92.8 | 97.8 | 96.7 | 98.5 |

Activator F = [N,N-dimethylanilinium] [tetrakis(pentafluorophenyl)borate]
TNOA = tri-n-octyl aluminum
TMC rac-5 = rac-dimethylsilylene-bis(2-methyl-4-carbazolyl-indenyl)zirconium dimethyl
Comparative TMC rac-D = rac-dimethylsilylene-bis[(2-methyl-4-phenyl)indenyl]zirconium dimethyl
Comparative TMC rac-E = rac-dimethylsilylene-bis[(2-methyl-4-(3',5'-di$^t$butyl)phenyl)indenyl]zirconium dimethyl Analytical methods for Higher Pressure Propylene Polymerizations Examples HPP-1 to HPP-10 and Comparative Examples HPP-C1 to HPP-C6

Differential Scanning Calorimetry (DSC)

Thermal transitions were measured on heating and cooling the sample from the solid state and melt respectively using Differential Scanning Calorimetry (DSC). For crystallization temperature ($T_c$) and melting temperature ($T_m$), the measurements were conducted using a TA Instrument MDSC 2920 or Q1000 Tzero-DSC and data analyzed using the standard analysis software by the vendor. 3 to 10 mg of polymer was encapsulated in an aluminum pan and loaded into the instrument at room temperature. The sample was heated to 210° C., cooled to −70° C., then heated to 210° C. all at a rate of 10° C./min. Each sample was held at 210° C. for 5 minutes to establish a common thermal history. Crystallization behavior was evaluated by cooling the sample from the melt to sub-ambient temperature at a cooling rate of 10° C./min. The sample was held at the low temperature for 10 minutes to fully equilibrate in the solid state and achieve a steady state. Second heating data was measured by heating this in-situ melt-crystallized sample at 10° C./min. The melting temperatures reported in Tables 5, 6 and 8 are the peak melting temperatures from the second melt unless otherwise indicated. For polymers displaying multiple peaks, the higher melting peak temperature was reported.

Areas under the curve are used to determine the $H_f$ which can be used to calculate the degree of crystallinity (also referred to as percent crystallinity). For determining polypropylene crystallinity, a value of 189 J/g is used as the equilibrium $H_f$ for 100% crystalline polypropylene. The percent crystallinity for the propylene polymers is calculated using the formula, [area under the curve (J/g)×42 g/mol/189 (J/g)]*100%. For other polymers the percent crystallinity is calculated using the formula, [area under the curve (Joules/gram)/B (Joules/gram)]*100, where B is the $H_f$ for the homopolymer of the major monomer component. These values for B are to be obtained from the Polymer Handbook, Fourth Edition, published by John Wiley and Sons, New York 1999.

Gel Permeation Chromatography (GPC-DRI).

The analysis was performed using a Waters 2000 (Gel Permeation Chromatograph) with DRI detector. The detailed GPC conditions are listed in Table 7. Standards and samples were prepared in inhibited TCB (1,2,4-trichlorobenzene) solvent. Nineteen polystyrene standards (PS) were used for calibrating the GPC. PS standards used are from EasiCal Pre-prepared Polymer calibrants (PL Laboratories). Calculation for converting narrow polystyrene standard peak molecular weight (for example 7500000 polystyrene) to polypropylene peak molecular weight (4630505) is: $M_{pp}=10^{\wedge}(\log 10(0.0000175/0.0002288)/(1+0.705)+\log 10(M_{ps})*(1+0.67)/(1+0.705))$, where $M_{pp}$ is molecular weight for polypropylene and $M_{ps}$ is the molecular weight for polystyrene. From this, an elution retention time to polypropylene molecular weight relationship is obtained.

The samples were accurately weighed and diluted to a ~0.75 mg/mL concentration and recorded. The standards and samples were placed on a PL Labs 260 Heater/Shaker at 160° C. for two hours. These were filtered through a 0.45 micron steel filter cup then analyzed.

TABLE 7

Gel Permeation Chromatography (GPC) measurement conditions

| INSTRUMENT | | WATERS 2000 |
|---|---|---|
| COLUMN | Type: | 3 × Mixed Bed Type "LS" "B" |
| | | 10 Micron PD (high porosity col.'s) |
| | Length: | 300 mm |
| | ID: | 7.8 mm |
| | Supplier: | Polymer Labs |
| SOLVENT | | 0.5 ml/min TCB inhibited |
| PROGRAM | | (inhibited with BHT at 1500 ppm w/v %) BHT is 2,6-di-tert-butyl-4-methyl phenol |
| DETECTOR | | Differential Refractive Index (DRI) |
| TEMPERATURE | Injector: | 135° C. |
| | Detector: | 135° C. |
| | Column: | 135° C. |
| INJECTION VOLUME | | 301.5 µL |
| SAMPLE CONCENTRATION | | (0.75 mg./ml.) |
| SOLVENT DILUENT | | (6 mg polymer to 8 ml TCB)$_{(135C)}$ TCB inhibited |

| Alpha & K Values in TCB @ 135° C. | | |
|---|---|---|
| Polymer | Alpha (α) | K |
| Polystyrene | 0.670 | 1.750 × 10$^{-4}$ |
| Polypropylene | 0.705 | 2.288 × 10$^{-4}$ |

Continuous Higher Pressure Reactor Polymerizations:

All polymerization experiments were performed in a continuous stirred tank reactor (CSTR) made by Autoclave Engineers, Erie Pa. The reactor was designed for operating at a maximum pressure and temperature of 207 MPa (30 kpsi) and 225° C., respectively. The nominal reactor volume was 150 mL with a working volume of 127 mL (working volume lower due to reactor internals). The reactor was equipped with an electric heater and with a stirrer with a magnetic drive. A pressure transducer located on the monomer feed line measured the pressure in the reactor. The temperature was measured inside the reactor using a type-K thermocouple. The reactor was protected against over-pressurization by automatically opening an air-actuated valve (High Pressure Company, Erie, Pa.) in case the reactor pressure exceeded the preset limit. A flush-mounted rupture disk located on the side of the reactor provided further protection against catastrophic pressure failure. All product lines were heated to ~150° C. to prevent fouling. The reactor body had two heating bands that were controlled by a programmable logic control device (PLC). The reactor did not have cooling capability. Once the reactor lined out during polymerization, its temperature was controlled manually by adjusting the flow rates of the monomer and catalyst feeds. No external heating was necessary in most experiments, i.e. the reactor temperature was maintained by controlling the heat released by the polymerization process.

Two independent lock-hopper assemblies were used to manage the effluent flow from the reactor: one for waste collection during start up and shut down, and the other one for product collection during the balance period at lined out, steady state conditions. Each lock-hopper consisted of two air-actuated valves bracketing a short piece of high-pressure tubing. Changing the internal diameter and/or the length of the lock-hopper tube allowed the adjustment of the volume of the lock-hoppers. Aliquots of the reactor content were taken out continuously by running the lock-hopper valves in cycles. One lock-hopper cycle consisted of first opening and closing of the valve between the lock-hopper tube and the reactor followed by opening and closing the downstream valve. Adjustments in the frequency of the lock-hopper cycles allowed maintaining the desired reactor pressure at a preset feed rate. The volume and the frequency of the two lock-hoppers were always set the same to allow switching between the lock-hoppers without affecting the steady state condition of the reactor. A drain port on the bottom of the reactor was used to empty the reactor after each experiment.

The application of lock-hoppers for product removal afforded robust reactor operations independent of the properties of the polymer made and/or the polymer concentration in the effluent. This operation mode, however, introduced short-term fluctuations both in the pressure and the temperature of the reactor. The reported reaction pressure and temperature values were obtained by calculating the averages of the pressure and temperature data acquired during the entire time of product collection, which can be referred to as balance period.

Propylene was fed from low-pressure cylinders equipped with a dip leg for liquid delivery to the reactor. Heating blankets provided heat to increase the cylinder head pressure to deliver the monomer to the feed pump at a pressure above the bubble point of the feed. The low-pressure monomer feed was also stabilized against bubble formation by cooling the pump head using chilled water running at 10° C. The monomer feed was purified using two separate beds in series: activated copper (reduced in flowing $H_2$ at 225° C. and 1 bar) for oxygen removal and molecular sieve (5 A, activated in flowing $N_2$ at 270° C.) for water removal. The purified monomer feed was fed by a diaphragm pump (Model MhS 600/11, ProMinent Orlita, Germany) through the stirrer head into the reactor. The monomer flow rate was measured by a Coriolis mass flow meter (Model PROline Promass 80, Endress and Hauser) that was located downstream of the purification traps on the low-pressure side of the feed pump. The pressure fluctuation in the reactor caused some minor fluctuation in the feed rate. The reported feed flows were determined by averaging the flow rate during the entire balance period.

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 120° C. and transferred hot to the antechamber of the dry box. Stock solutions of the catalyst precursors and the activators were prepared using purified toluene and stored in amber bottles inside the dry box. Aliquots were taken to prepare fresh activated catalyst solutions before each polymerization experiment. Catalyst concentrations of the catalyst feed were adjusted to maintain the target reaction temperature at feed rates that introduced not more than 3-8 wt % of catalyst solvent (toluene) into the reactor. Hexane diluent was fed into the reactor. Due to the small scale and daily start-ups of our reactor, impurity levels were difficult to stabilize, thus catalytic activities varied from run to run.

In a typical experiment, the reactor was preheated to ~10° C.-15° C. below that of the desired reaction temperature. During the line-out period, the catalyst feed and lock-hopper rates were adjusted to reach and maintain the target reaction temperature and pressure. Once the reactor reached steady state at the desired conditions, product collection was switched from the waste collection to the on-balance product collection vessel. The reactor was typically run on-balance between 30 to 90 min, after which the effluent was redirected to the waste collection vessel and the reactor was shut down. The products were collected from the on-balance vessel. The products were vacuum-dried overnight at 70° C. before characterization. The conversion and reaction rates were determined based on the total feed used and the product yield during the balance period.

Catalyst productivity, expressed as g product per g catalyst, is the product of catalyst activity and residence time. In order to generate a scaleable kinetic characterization parameter for catalytic activity, we also determined the turnover frequency (TOF), expressed as mol monomer converted per mol catalyst in one second. TOF was calculated by dividing the average monomer conversion rate with the average catalyst inventory in the reactor. Turn over number (TON) was determined by multiplying the catalyst feed rate with the residence time of the reaction medium. The residence time was derived from the reactor free volume and the volumetric flow rate of the reaction medium. The total mass flow was generated by summing of the individual feed flows. The software enabled the calculation of the density of polymer-containing blends at reactor conditions.

Anhydrous toluene from Sigma-Aldrich was used in catalyst preparation and for reactor flushing. Copper and molecular sieve traps were installed in the toluene feed line. Propylene Grade 2.5 (BOC) was obtained in #100 low-pressure cylinders. Tri-isobutylaluminum (Sigma-Aldrich) was used for passivating the feed line and the reactor if they were exposed to air during maintenance.

Exemplary results obtained in a continuous polymerization unit operating at elevated monomer pressures are listed in Table 8(a). Melting data listed were obtained at a cooling rate of 10° C./min using differential scanning calorimetry (DSC) as described above. Heat of fusion of the melting endotherm is listed as ΔHf. Mw listed in Table 8(c) was obtained via the GPC procedure above.

TABLE 8(a)

Continuous Higher Pressure Reactor Propylene Polymerization Data using Precatalyst rac-5[1]

| Ex. # | Act.[2] | Hexane Diluent (wt %) | Temp (° C.) | Pressure (psig) | Res. Time (min) | Prod. (kg P/g rac-5) | Prod. (kg P/g (rac-5 + Act)) | Monomer feed rate (g/min) |
|---|---|---|---|---|---|---|---|---|
| CHPP-1 | G | 68 | 102 | 2423 | 13.4 | 50 | 18 | 5.1 |
| CHPP-2 | G | 68 | 108 | 1919 | 13.7 | 3 | 11 | 5.3 |
| CHPP-3 | G | 70 | 107 | 1735 | 12.3 | 19 | 7 | 5.2 |
| CHPP-4 | F | 69 | 108 | 2041 | 12.8 | 15 | 7 | 5.3 |
| CHPP-5 | F | 69 | 114 | 1810 | 11.0 | 17 | 8 | 6.2 |
| CHPP-6 | F | 69 | 123 | 1703 | 10.1 | 10 | 5 | 6.8 |

[1]Precatalyst rac-5 = rac-dimethylsilylene-bis(2-methyl-4-carbazolyl-indenyl)zirconium dimethyl
[2]Act. = Activator, F = [N,N-dimethylanilinium] [tetrakis(pentafluorophenyl)borate], G = [N,N-dimethylanilinium] [tetrakis(heptafluoronaphthyl)borate].

TABLE 8(b)

Continuous Higher Pressure Reactor Propylene Polymerization Data using Precatalyst rac-5[1]

| Ex. # | Scavenger feed rate (mol/ppm) | Scavenger/catalyst metal ratio (mol/mol) | Act/TMC metal ratio (mol/mol) | C3 conversion (%) | Cat Feed rate (mol/ppm) |
|---|---|---|---|---|---|
| CHPP-1 | 11 | 78 | 1.154 | 31.6 | 0.141 |
| CHPP-2 | 10 | 31 | 1.154 | 36.1 | 0.324 |
| CHPP-3 | 10 | 23 | 1.158 | 31.8 | 0.439 |
| CHPP-4 | 10 | 15 | 1.155 | 36.0 | 0.648 |
| CHPP-5 | 11 | 19 | 1.064 | 34.5 | 0.557 |
| CHPP-6 | 15 | 17 | 1.064 | 3.09 | 0.863 |

[1]Precatalyst rac-5 = rac-dimethylsilylene-bis(2-methyl-4-carbazolyl-indenyl)zirconium dimethyl Scavenger = tri-n-octyl aluminum.

TABLE 8(c)

Continuous Higher Pressure Reactor Propylene Polymerization Data using Precatalyst rac-5[1]

| EX. # | MFR* (g/10 min) | Tm (° C.) | ΔHf (J/g) | Mw (g/mol) | TON (mol olefin/g M atom) | TOF (1/s) |
|---|---|---|---|---|---|---|
| CHPP-1 | 2 | 157.4 | 100.7 | 400126 | 9.08E+05 | 1128 |
| CHPP-2 | 7 | 155.9 | 99.3 | 278579 | 5.54E+05 | 676 |
| CHPP-3 | 8 | 156.4 | 102.5 | 277627 | 3.42E+05 | 463 |
| CHPP-4 | 8 | 158.1 | 104.1 | 247574 | 2.71E+05 | 354 |
| CHPP-5 | 17 | 158.8 | 102.8 | 194742 | 3.02E+05 | 459 |
| CHPP-6 | 62 | 154.8 | 102.9 | 140699 | 1.75E+05 | 290 |

[1]Precatalyst rac-5 = rac-dimethylsilylene-bis(2-methyl-4-carbazolyl-indenyl)zirconium dimethyl
*MFR (Melt Flow Rate - determined by ASTM1238, 230° C., 2.16 kg using Dynisco Kayeness Polymer Test Systems Series 4003 apparatus on samples stabilized by using Irganox 1010.)

All documents described herein are incorporated by reference herein, including any priority documents and/or testing procedures, except to the extent they are inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A process for producing a propylene-based olefin homopolymer or copolymer, the process comprising contacting a monomer composition comprising propylene with a polymerization catalyst system under homogeneous polymerization conditions and at a temperature of about 100° C. to about 195° C., wherein the polymerization catalyst system includes an activator and a catalyst compound of the formula:

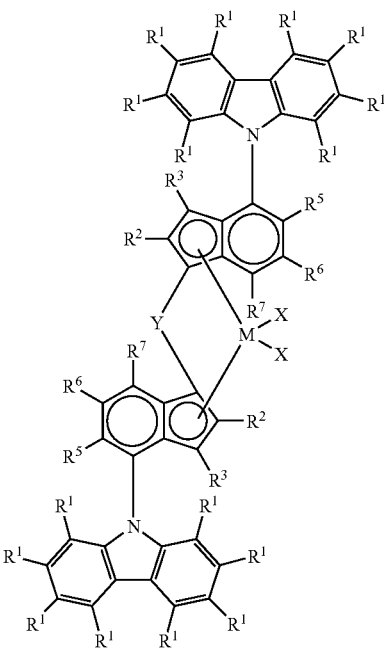

wherein

M is a transition metal selected from group 4 of the Periodic Table of the Elements;

each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$ and $R^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand;

2) obtaining a polymer having a melting point of 155° C. or more, and an Mn of 120,000 g/mol or more (GPC-DRI, relative to linear polystyrene standards).

2. The process of claim 1 wherein said temperature is from greater than 100° C. to about 180° C.

3. The process of claim 1 wherein each $R^1$ is hydrogen and each of $R^2$, $R^3$, $R^5$, $R^6$ and $R^7$ is, independently, hydrogen, or a hydrocarbyl group having 1 to 10 carbon atoms.

4. The process of claim 1 wherein $R^2$ is methyl.

5. The process of claim 1 wherein each $R^1$, $R^3$, $R^5$, $R^6$, and $R^7$ are hydrogen.

6. The process of claim 1 wherein said monomer consists essentially of propylene.

7. The process of claim 1 wherein the monomer composition comprises a further comonomer selected from the group consisting of: ethylene, and $C_4$ to $C_{20}$ α-olefins, cyclic olefins or α-olefinic diolefins.

8. The process of claim 1 wherein the monomer is 100% propylene.

9. The process of claim 1 wherein the catalyst compound is selected from the group consisting of dimethylsilylene-bis[2-methyl-4-(carbazol-9-yl)inden-1-yl]zirconium dimethyl and dimethylsilylene-bis[2-methyl-4-(carbazol-9-yl)inden-1-yl]zirconium dichloride.

10. The process of claim 1 wherein the activator comprises a non-coordinating anion.

11. A process for producing a propylene-based olefin homopolymer or copolymer, the process comprising:

A) contacting a monomer composition comprising propylene with a polymerization catalyst system under homogeneous polymerization conditions of: 1) a temperature of about 65° C. to about 150° C., 2) a pressure of 1.72 to 35 MPa, 3) from 20 to 65 wt % diluent or solvent, based upon the total weight of feeds to the polymerization reactor, and 4) 0 to 5 wt % scavenger, based upon the total weight of feeds to the polymerization reactor, wherein: a) the olefin monomers and any comonomers are present in the polymerization system at 15 wt % or more, b) the propylene is present at 80 wt % or more based upon the weight of all monomers and comonomers present in the feed, c) the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system, wherein the polymerization catalyst system includes an activator and a catalyst compound of the formula:

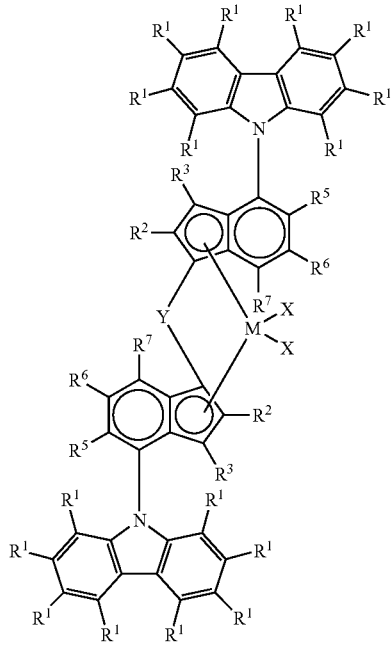

wherein

M is a transition metal selected from group 4 of the Periodic Table of the Elements; each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$ and $R^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand;

B) obtaining a polymer having a melting point of 145° C. or more, and an Mn of 150,000 g/mol or more (GPC-DRI, corrected to polypropylene values).

12. The process of claim 11 wherein said contacting is conducted at a pressure in excess of 5 MPa.

13. The process of claim 11 wherein said temperature is from greater than 100° C. to about 150° C.

14. The process of claim 11 wherein each $R^1$ is hydrogen and each of $R^2$, $R^3$, $R^5$, $R^6$ and $R^7$ is, independently, hydrogen, or a hydrocarbyl group having 1 to 10 carbon atoms.

15. The process of claim 11 wherein $R^2$ is methyl.

16. The process of claim 11 wherein each $R^1$, $R^3$, $R^5$, $R^6$, and $R^7$ are hydrogen.

17. The process of claim 11 wherein said monomer consists essentially of propylene.

18. The process of claim 11 wherein the monomer composition comprises a further comonomer selected from the group consisting of: ethylene, and $C_4$ to $C_{20}$ α-olefins, cyclic olefins or α-olefinic diolefins.

19. The process of claim 11 wherein the catalyst compound is selected from the group consisting of dimethylsilylene-bis [2-methyl-4-(carbazol-9-yl)inden-1-yl]zirconium dimethyl and dimethylsilylene-bis [2-methyl-4-(carbazol-9-yl)inden-1-yl]zirconium dichloride.

20. The process of claim 11 wherein the activator comprises a non-coordinating anion.

21. A process for producing a propylene-based olefin homopolymer or copolymer, the process comprising:
A) contacting a monomer composition comprising propylene with a polymerization catalyst system under homogeneous polymerization conditions of 1) a temperature of 60° C. or more, 2) a pressure of 15 to 1000 MPa, 3) the olefin monomers and any comonomers are present in the polymerization system at 40 wt % or more, 4) the propylene is present at 80 wt % or more based upon the weight of all monomers and comonomers present in the feed, 5) the polymerization occurs at a temperature above the solid-fluid phase transition temperature of the polymerization system and a pressure no lower than 2 MPa below the cloud point pressure of the polymerization system;
wherein the polymerization catalyst system includes an activator and a catalyst compound of the formula:

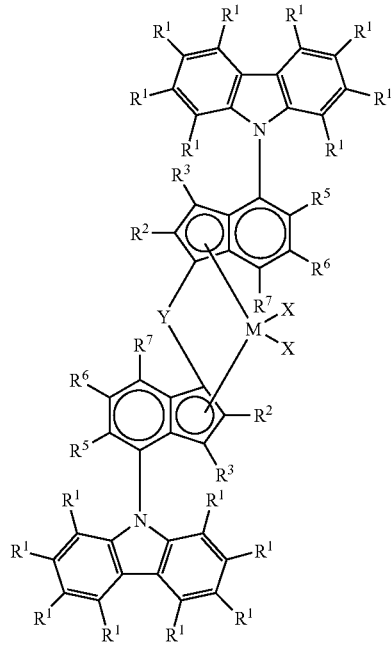

wherein
M is a transition metal selected from group 4 of the Periodic Table of the Elements; each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$ and $R^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand;

B) obtaining a polymer having a melting point of 140° C. or more, and an Mn of 300,000 g/mol or more (GPC-DRI, corrected to polypropylene values).

22. The process of claim 21 wherein said temperature is from greater than 100° C. to about 250° C.

23. The process of claim 21 wherein each $R^1$ is hydrogen and each of $R^2$, $R^3$, $R^5$, $R^6$ and $R^7$ is, independently, hydrogen, or a hydrocarbyl group having 1 to 10 carbon atoms.

24. The process of claim 21 wherein $R^2$ is methyl.

25. The process of claim 21 wherein each $R^1$, $R^3$, $R^5$, $R^6$, and $R^7$ are hydrogen.

26. The process of claim 21 wherein said monomer consists essentially of propylene.

27. The process of claim 21 wherein the monomer composition comprises a further comonomer selected from the group consisting of: ethylene, and $C_4$ to $C_{20}$ α-olefins, cyclic olefins or α-olefinic diolefins.

28. The process of claim 21 wherein the monomer is 100% propylene.

29. The process of claim 21 wherein the catalyst compound is selected from the group consisting of dimethylsilylene-bis [2-methyl-4-(carbazol-9-yl)inden-1-yl]zirconium dimethyl and dimethylsilylene-bis[2-methyl-4-(carbazol-9-yl)inden-1-yl]zirconium dichloride.

30. The process of claim 1 wherein the activator comprises a non-coordinating anion.

31. The process of claim 11 wherein the process is continuous.

32. A process for producing a propylene-based olefin homopolymer or copolymer, the process comprising:
1) contacting a monomer composition comprising propylene with a polymerization catalyst system under homogeneous polymerization conditions and at a temperature of about 100° C. to about 195° C., wherein the polymerization catalyst system includes an activator and dimethylsilylene-bis[2-methyl-4-(carbazol-9-yl)inden-1-yl]zirconium dichloride; and
2) obtaining a polymer having a melting point of 155° C. or more, and an Mn of 120,000 g/mol or more (GPC-DRI, relative to linear polystyrene standards).

33. A process for producing a propylene-based olefin homopolymer or copolymer, the process comprising:
A) contacting a monomer composition comprising propylene with a polymerization catalyst system under homogeneous polymerization conditions of: 1) a temperature of about 65° C. to about 150° C., 2) a pressure of 1.72 to 35 MPa, 3) from 20 to 65 wt % diluent or solvent, based upon the total weight of feeds to the polymerization reactor, and 4) 0 to 5 wt % scavenger, based upon the total weight of feeds to the polymerization reactor, wherein: a) the olefin monomers and any comonomers are present in the polymerization system at 15 wt % or more, b) the propylene is present at 80 wt % or more based upon the weight of all monomers and comonomers present in the feed, c) the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system;

wherein the polymerization catalyst system includes an activator and dimethylsilylene-bis[2-methyl-4-(carbazol-9-yl)inden-1-yl]zirconium dichloride; and B) obtaining a polymer having a melting point of 145° C. or more, and an Mn of 150,000 g/mol or more (GPC-DRI, corrected to polypropylene values).

34. A process for producing a propylene-based olefin homopolymer or copolymer, the process comprising:

A) contacting a monomer composition comprising propylene with a polymerization catalyst system under homogeneous polymerization conditions of 1) a temperature of 60° C. or more, 2) a pressure of 15 to 1000 MPa, 3) the olefin monomers and any comonomers are present in the polymerization system at 40 wt % or more, 4) the propylene is present at 80 wt % or more based upon the weight of all monomers and comonomers present in the feed, and 5) the polymerization occurs at a temperature above the solid-fluid phase transition temperature of the polymerization system and a pressure no lower than 2 MPa below the cloud point pressure of the polymerization system;

wherein the polymerization catalyst system includes an activator and dimethylsilylene-bis[2-methyl-4-(carbazol-9-yl)inden-1-yl]zirconium dichloride; and B) obtaining a polymer having a melting point of 140° C. or more, and an Mn of 300,000 g/mol or more (GPC-DRI, corrected to polypropylene values).

35. A process for producing a propylene-based olefin homopolymer or copolymer, the process comprising:

1) contacting a monomer composition comprising propylene with a polymerization catalyst system under homogeneous polymerization conditions and at a temperature of about 100° C. to about 195° C., wherein the polymerization catalyst system includes an activator and dimethylsilylene-bis[2-methyl-4-(carbazol-9-yl)inden-1-yl]zirconium dimethyl; and 2) obtaining a polymer having a melting point of 155° C. or more, and an Mn of 120,000 g/mol or more (GPC-DRI, relative to linear polystyrene standards).

36. A process for producing a propylene-based olefin homopolymer or copolymer, the process comprising:

A) contacting a monomer composition comprising propylene with a polymerization catalyst system under homogeneous polymerization conditions of: 1) a temperature of about 65° C. to about 150° C., 2) a pressure of 1.72 to 35 MPa, 3) from 20 to 65 wt % diluent or solvent, based upon the total weight of feeds to the polymerization reactor, and 4) 0 to 5 wt % scavenger, based upon the total weight of feeds to the polymerization reactor, wherein: a) the olefin monomers and any comonomers are present in the polymerization system at 15 wt % or more, b) the propylene is present at 80 wt % or more based upon the weight of all monomers and comonomers present in the feed, c) the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system;

wherein the polymerization catalyst system includes an activator and dimethylsilylene-bis[2-methyl-4-(carbazol-9-y1)inden-1-yl]zirconium dimethyl; and B) obtaining a polymer having a melting point of 145° C. or more, and an Mn of 150,000 g/mol or more (GPC-DRI, corrected to polypropylene values).

37. A process for producing a propylene-based olefin homopolymer or copolymer, the process comprising:

A) contacting a monomer composition comprising propylene with a polymerization catalyst system under homogeneous polymerization conditions of 1) a temperature of 60° C. or more, 2) a pressure of 15 to 1000 MPa, 3) the olefin monomers and any comonomers are present in the polymerization system at 40 wt % or more, 4) the propylene is present at 80 wt % or more based upon the weight of all monomers and comonomers present in the feed, and 5) the polymerization occurs at a temperature above the solid-fluid phase transition temperature of the polymerization system and a pressure no lower than 2 MPa below the cloud point pressure of the polymerization system;

wherein the polymerization catalyst system includes an activator and dimethylsilylene-bis[2-methyl-4-(carbazol-9-yl)inden-1-yl]zirconium dimethyl; and B) obtaining a polymer having a melting point of 140° C. or more, and an Mn of 300,000 g/mol or more (GPC-DRI, corrected to polypropylene values).

* * * * *